(12) United States Patent
Shoen et al.

(10) Patent No.: US 11,760,294 B2
(45) Date of Patent: Sep. 19, 2023

(54) WORK VEHICLE

(71) Applicant: KUBOTA CORPORATION, Osaka (JP)

(72) Inventors: Shigeo Shoen, Sakai (JP); Kazuya Kiyama, Sakai (JP); Ryosuke Tanaka, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 239 days.

(21) Appl. No.: 17/352,477

(22) Filed: Jun. 21, 2021

(65) Prior Publication Data

US 2021/0402943 A1    Dec. 30, 2021

(30) Foreign Application Priority Data

Jun. 29, 2020  (JP) .................................. 2020-111095

(51) Int. Cl.
  *B60R 21/13*    (2006.01)
  *B62D 25/16*    (2006.01)
  *B62D 33/06*    (2006.01)
  *B60R 3/00*    (2006.01)

(52) U.S. Cl.
  CPC .......... *B60R 21/131* (2013.01); *B62D 25/168* (2013.01); *B62D 33/0617* (2013.01); *B60R 3/00* (2013.01); *B60Y 2200/221* (2013.01)

(58) Field of Classification Search
  CPC .......... B60R 21/131; B60R 2021/0076; B62D 25/15; B62D 25/163; B62D 25/168; B62D 33/0604
  USPC .................................................. 296/190.03
  See application file for complete search history.

(56) References Cited

U.S. PATENT DOCUMENTS

| | | | | |
|---|---|---|---|---|
| 4,059,304 A * | 11/1977 | Yamanaka | ............. | B62D 33/02 188/374 |
| 6,460,886 B2 * | 10/2002 | Osuga | ................. | B60K 17/105 180/374 |
| 7,703,840 B2 * | 4/2010 | Fukunaga | .......... | B62D 33/0617 296/190.07 |
| 8,328,274 B2 * | 12/2012 | Hasegawa | .......... | B62D 33/0617 180/371 |
| 8,419,061 B2 * | 4/2013 | Fukunaga | ............. | B60R 21/131 280/756 |
| 9,061,718 B2 * | 6/2015 | Tani | ....................... | B62D 49/00 |

(Continued)

FOREIGN PATENT DOCUMENTS

| | | | | |
|---|---|---|---|---|
| EP | 1574728 A2 * | 9/2005 | .......... | B62D 25/163 |
| EP | 3 470 583 A2 | 4/2019 | | |

(Continued)

OTHER PUBLICATIONS

English translation of JP 2016-175546; retrieved via PatentTranslate located at www.epo.org. (Year: 2023).*

(Continued)

*Primary Examiner* — Jason S Daniels
(74) *Attorney, Agent, or Firm* — KEATING AND BENNETT, LLP

(57) ABSTRACT

A work vehicle includes a fender covering a rear wheel, a seat base to which the fender is fixed and on which a seat is installed, a step above or below the seat base and to which the seat base is fixed, and a first vibration insulating portion having a vibration insulating property and interposed between the step and the seat base.

16 Claims, 17 Drawing Sheets

(56) References Cited

U.S. PATENT DOCUMENTS

| | | | |
|---|---|---|---|
| 11,414,035 B2* | 8/2022 | Azuma | B60R 21/131 |
| 2011/0233909 A1* | 9/2011 | Fukunaga | B60R 21/131 |
| | | | 280/756 |
| 2015/0108789 A1* | 4/2015 | Knoblett | B62D 33/0617 |
| | | | 296/190.03 |
| 2018/0118134 A1 | 5/2018 | Komiya et al. | |
| 2020/0307693 A1* | 10/2020 | Kobayashi | B62D 49/08 |

FOREIGN PATENT DOCUMENTS

| | | |
|---|---|---|
| JP | 2006-117148 A | 5/2006 |
| JP | 2016-175546 A | 10/2016 |
| JP | 2016-222068 A | 12/2016 |
| KR | 10-2015-0145034 A | 12/2015 |
| WO | 2016/189940 A1 | 12/2016 |

OTHER PUBLICATIONS

Official Communication issued in corresponding European Patent Application No. 21181953.7, dated Oct. 20, 2021.

* cited by examiner

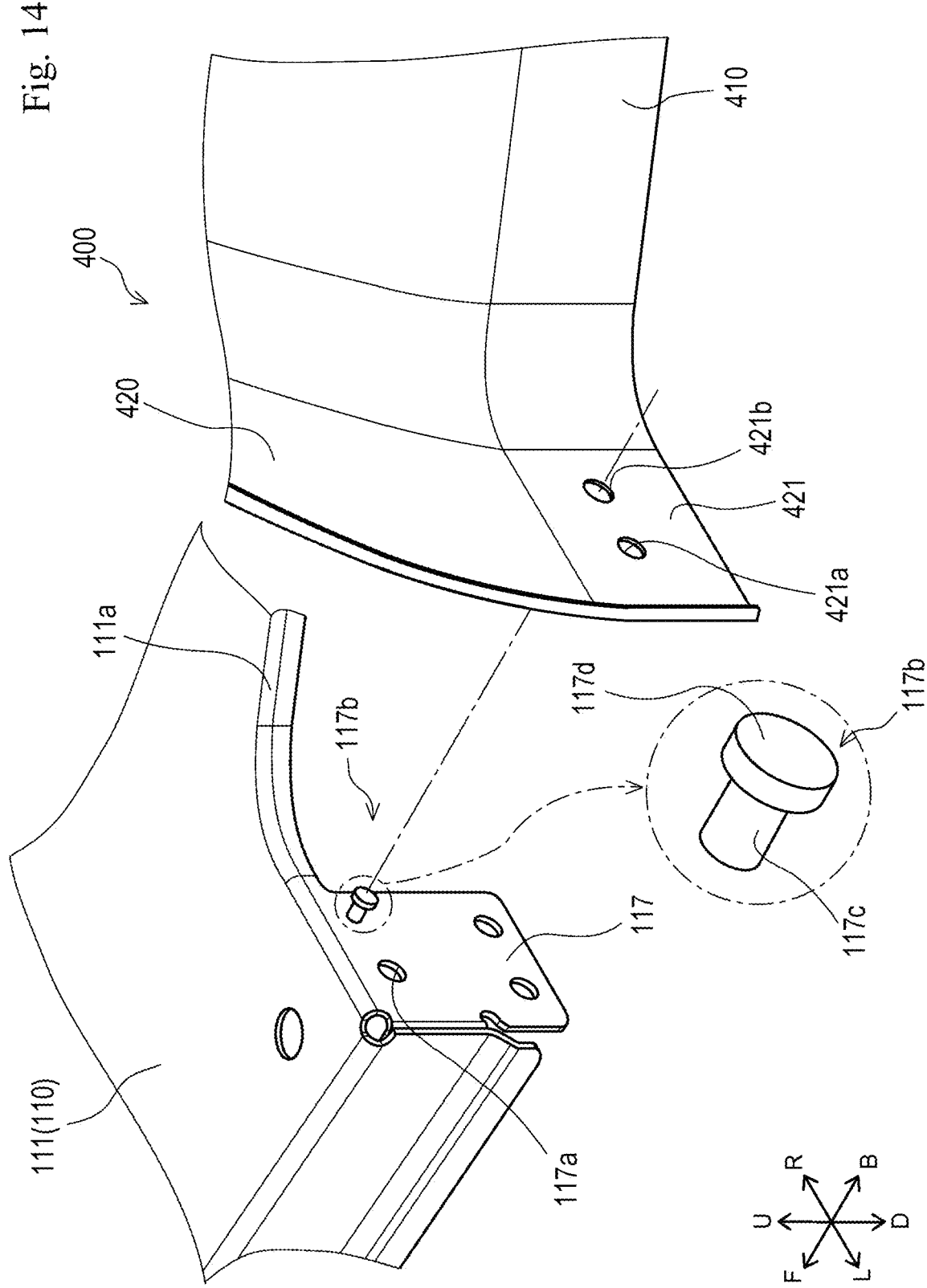

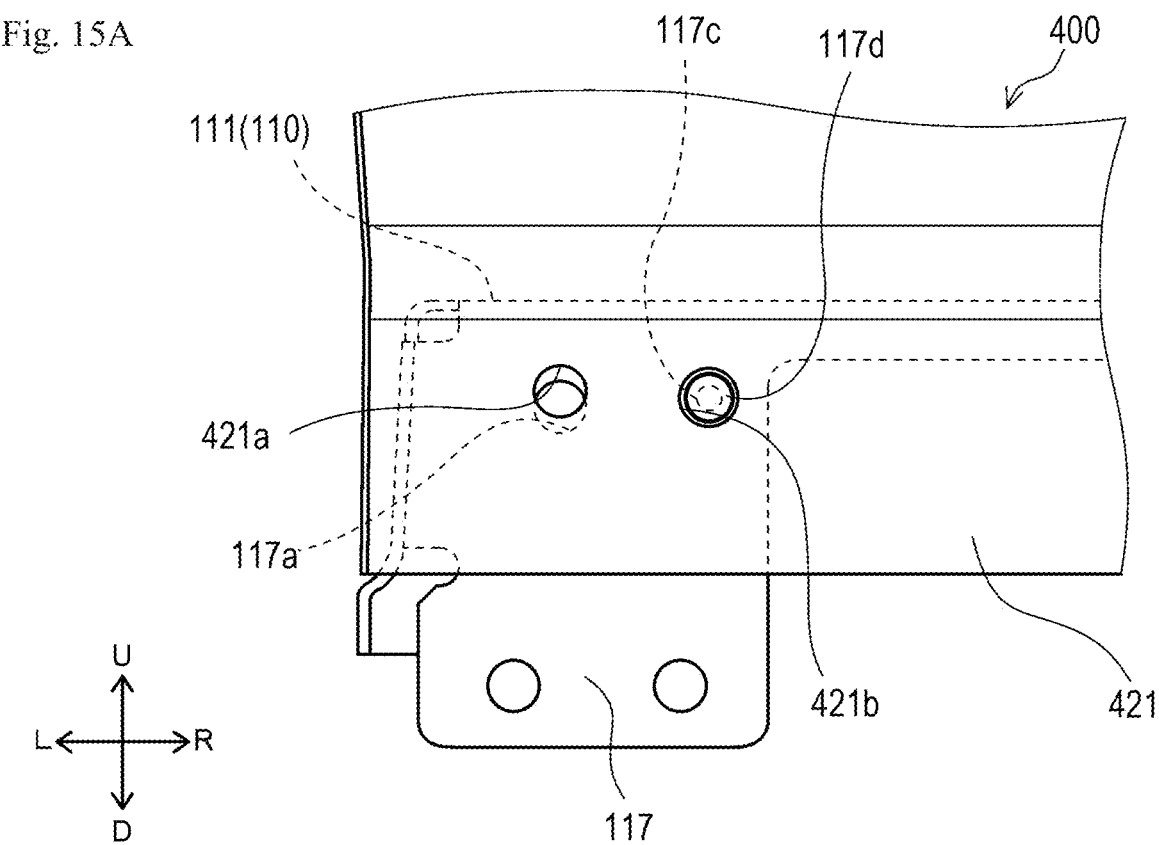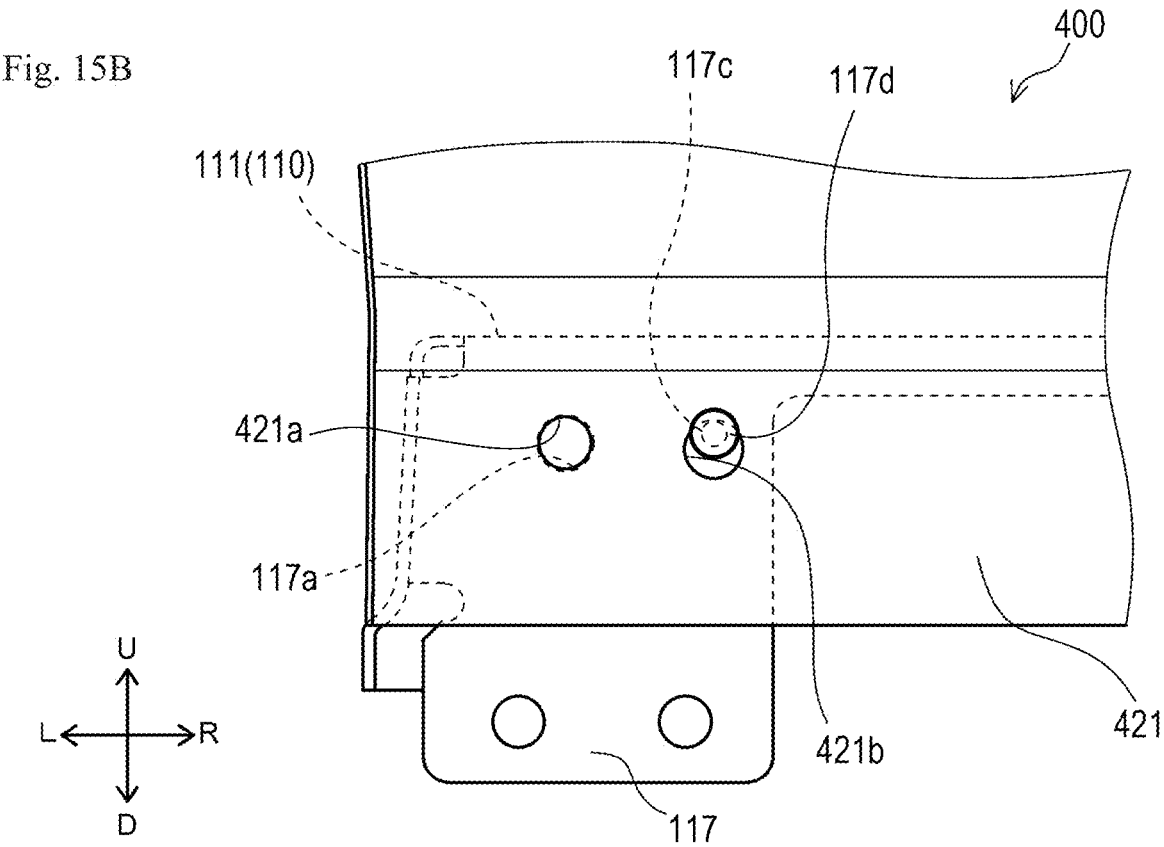

WORK VEHICLE

CROSS REFERENCE TO RELATED APPLICATIONS

This application claims the benefit of priority to Japanese Patent Application No. 2020-111095 filed Jun. 29, 2020. The entire contents of this application are hereby incorporated herein by reference.

BACKGROUND OF THE INVENTION

1. Field of the Invention

The disclosure relates to a technique of a work vehicle.

2. Description of the Related Art

Conventionally, a technique of a work vehicle such as a tractor having a step and a fender has been known. An example is disclosed in JP 2006-117148 A.

JP 2006-117148 A discloses a tractor in which left and right rear wheel fenders are connected to a driver's step provided to a driver's seat.

In the above-mentioned tractor, vibration from the rear wheel fenders may be transmitted to the driver's step. Therefore, it is desired to suppress the vibration transmitted from the rear wheel fenders to the driver's step.

SUMMARY OF THE INVENTION

Preferred embodiments of the present invention provide work vehicles, each of which reduces or prevents vibration transmitted from a fender to a step.

A work vehicle according to a preferred embodiment of the present invention includes a fender covering a rear wheel, a seat base to which the fender is fixed and on which a seat is installed, a step above or below the seat base and to which the seat base is fixed, and a first vibration insulating portion having a vibration insulating property and interposed between the step and the seat base.

A work vehicle according to a preferred embodiment of the present invention includes a ROPS (Rollover Protection Structure) that is disposed beside the fender and to which the fender is fixed, and a second vibration insulating portion having a vibration insulating property and interposed between the ROPS and the fender.

In a work vehicle according to a preferred embodiment of the present invention, the fender includes a fixation hole that is opened in a direction in which the fender and the ROPS are arrayed and through which a fastener used for fixation to the ROPS is inserted, and the second vibration insulating portion has a hole through which the fastener is inserted and is inserted through the fixation hole.

A work vehicle according to a preferred embodiment of the present invention includes a reinforcing portion that reinforces the fender, and a third vibration insulating portion having a vibration insulating property and interposed between the reinforcing portion and the ROPS.

In a work vehicle according to a preferred embodiment of the present invention, the third vibration insulating portion is used in common with the second vibration insulating portion.

In a work vehicle according to a preferred embodiment of the present invention, the fender includes a first portion fixed to the ROPS, and a second portion covering a radially outer portion of the rear wheel, and the reinforcing portion connects the first portion and the second portion.

In a work vehicle according to a preferred embodiment of the present invention, the fender includes a fixing portion fixed to the step while contacting the step.

A work vehicle according to a preferred embodiment of the present invention includes a mission case containing a power transmission mechanism, a first supporting portion that is provided to the mission case and supports the step from below and to which the step is fixed, and a fourth vibration insulating portion having a vibration insulating property and interposed between the first supporting portion and the step.

A work vehicle according to a preferred embodiment of the present invention includes a mission case containing a power transmission mechanism, a second supporting portion that is provided to the mission case and supports the seat base from below and to which the seat base is fixed, and a fifth vibration insulating portion having a vibration insulating property and interposed between the second supporting portion and the seat base.

The following effects are obtained by preferred embodiments of the present disclosure.

In a work vehicle according to a preferred embodiment of the present invention, vibration transmitted from the fender to the step is more effectively reduced or prevented.

In a work vehicle according to a preferred embodiment of the present invention, using the third vibration insulating portion in common with the second vibration insulating portion prevents an increase in the number of members.

In a work vehicle according to a preferred embodiment of the present invention, transmission of vibration from the fender to the step is more effectively reduced or prevented while securely fixing the fender to the step.

In a work vehicle according to a preferred embodiment of the present invention, vibration of the step is more effectively reduced or prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 14 is an enlarged exploded perspective view showing the step and the fender.

FIG. 15A is a rear view showing the state where a positioning protrusion is inserted through a positioning hole; FIG. 15B is a rear view showing the state where the positioning hole is placed on the positioning protrusion.

DETAILED DESCRIPTION OF THE PREFERRED EMBODIMENTS

In the following description, the directions indicated by arrow U, arrow D, arrow F, arrow B, arrow L, and arrow R are defined as an upward direction, a downward direction, a forward direction, a backward direction, a leftward direction, and a rightward direction, respectively.

Figure 1:
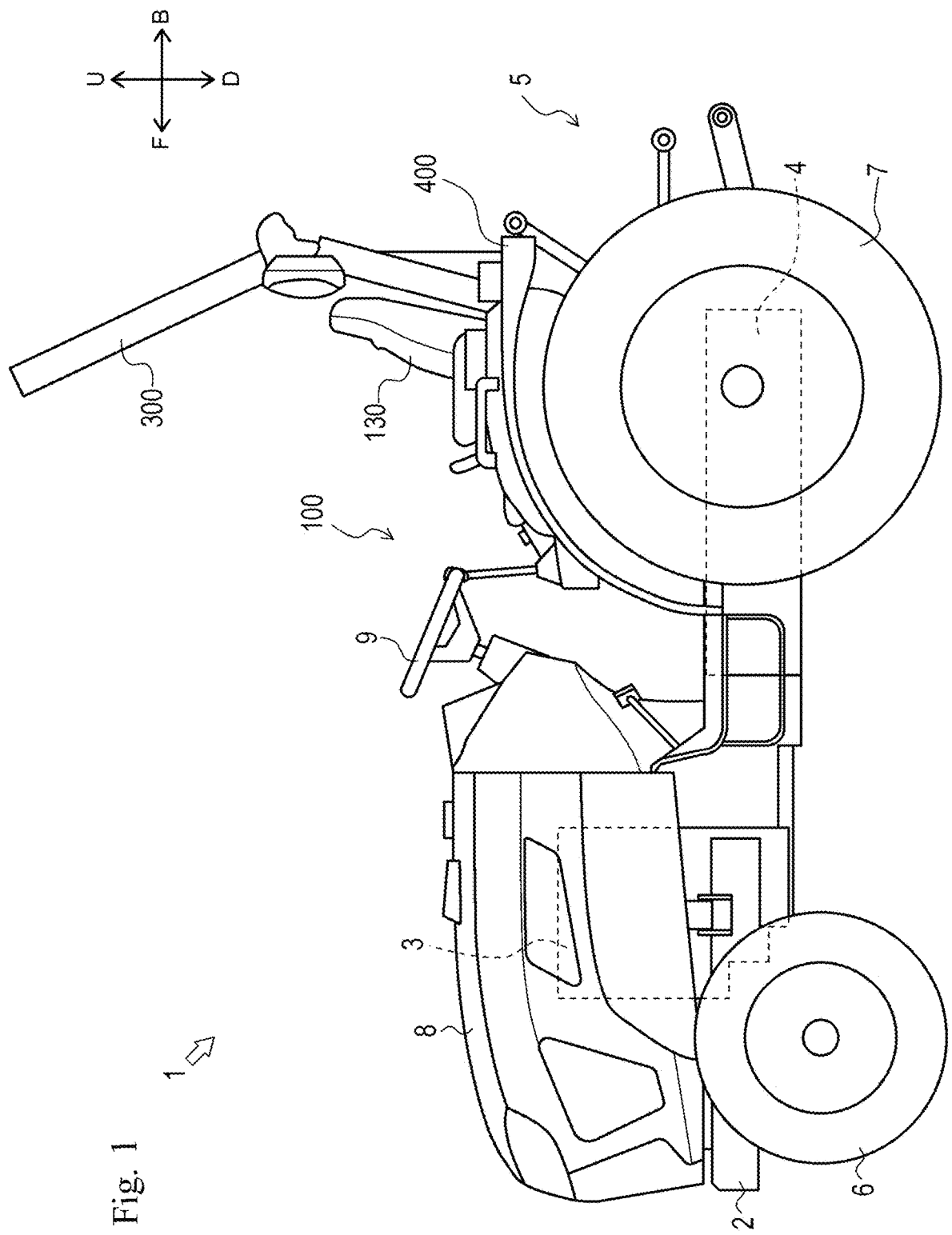
FIG. 1 is a side view showing an overall configuration of a tractor according to a preferred embodiment of the present invention.

The following will describe an entire configuration of a tractor 1 according to a preferred embodiment of the disclosure with reference to FIG. 1.

The tractor 1 mainly includes a body frame 2, an engine 3, a transmission case 4, a hydraulic elevator 5, front wheels 6, rear wheels 7, a hood 8, a riding portion 100, a ROPS 300, fenders 400, a reinforcing portion 500 (see FIG. 10), and the like.

The body frame 2 is disposed such that its longitudinal direction is in the forward-backward direction. The engine 3 is fixed to a rear portion of the body frame 2. The transmission case 4 is disposed behind the engine 3. The hydraulic elevator 5 is provided to a rear portion of the transmission case 4. Various working devices (such as a rotary tiller) can be mounted to the hydraulic elevator 5. Also, various working machines (such as a mower) can be mounted to a lower portion of the transmission case (between the front wheels 6 and the rear wheels 7).

The transmission case 4 contains a power transmission mechanism (not shown) such as a transmission. A clutch housing 4a is provided forward of the transmission case 4 (between the transmission case 4 and the engine 3) (see FIG. 3). The hydraulic elevator 5 is fixed to a rear portion of the transmission case 4 and includes a hydraulic case 5a containing a hydraulic cylinder (see FIG. 6).

A front portion of the body frame 2 is supported by the pair of left and right front wheels 6 via a front axle mechanism (not shown). The transmission case 4 is supported by the pair of left and right rear wheels 7 via a rear axle mechanism (not shown). The pair of left and right rear wheels 7 are covered by the fenders 400 from generally above.

In addition, the engine 3 is covered by the hood 8. The riding portion 100, on which a driver rides, is provided behind the hood 8. The ROPS 300 to protect the riding portion 100 is provided behind the riding portion 100.

Power of the engine 3 is subjected to a speed conversion at the transmission (not shown) contained in the transmission case 4 and is then made transmittable to the front wheels 6 via the front axle mechanism and made transmittable to the rear wheels 7 via the rear axle mechanism. Thus, the front wheels 6 and the rear wheels 7 are rotationally driven by the power of the engine 3, so that the tractor 1 can travel.

The transmission case 4, the riding portion 100 (steps 110 and a seat base 120, which will be described later), the ROPS 300, and the fenders 400 as described above are fixed to each other by using fasteners 20 shown in FIGS. 4, 5, and 17. Vibration insulating portions 30 are interposed at the fixing portions where the fasteners 20 are used. The following will describe the fasteners 20 and the vibration insulating portions 30 in detail with reference to FIGS. 4, 9, and 11.

Figure 4:
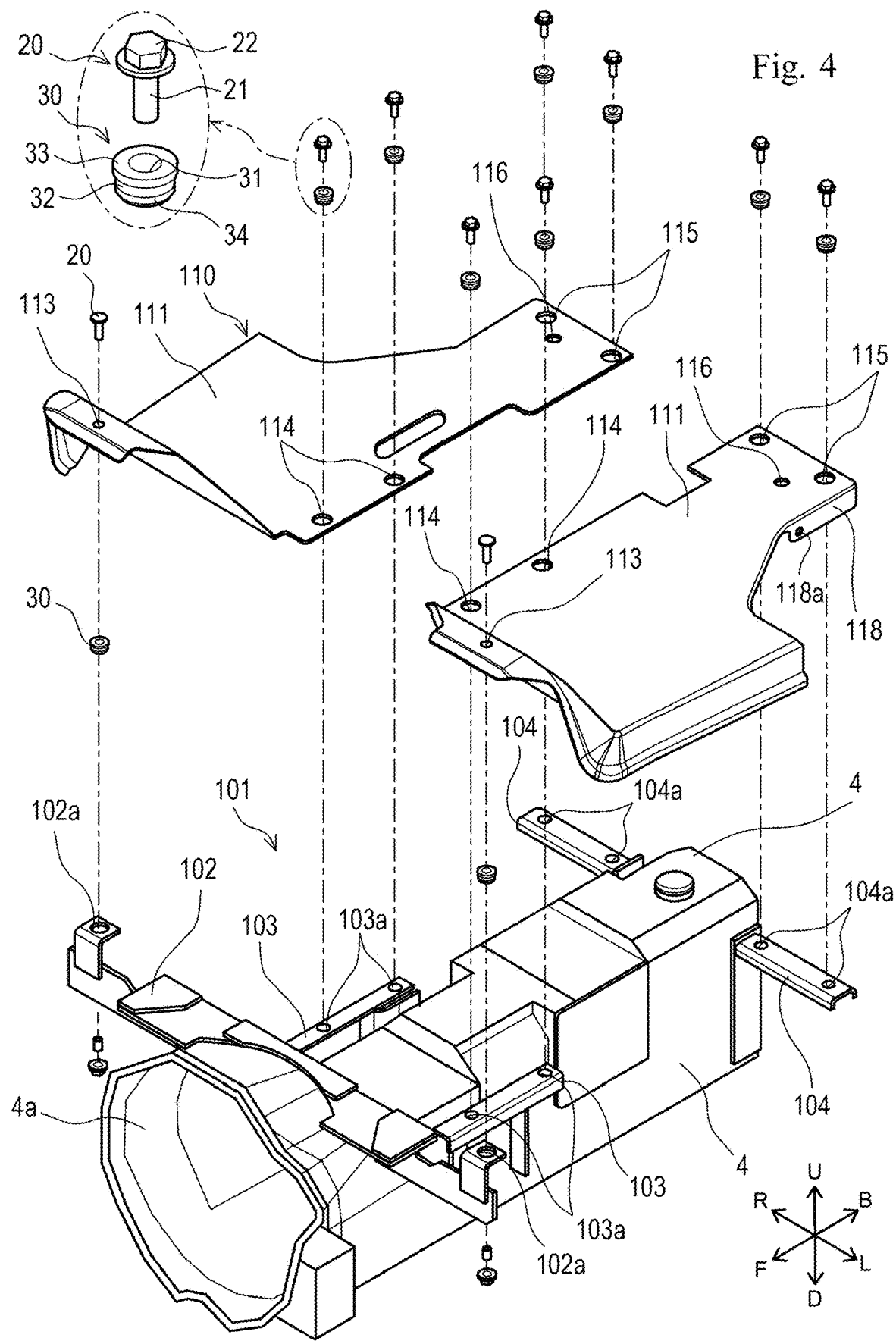
FIG. 4 is an exploded perspective view showing steps and a step supporting portion.
Figure 9:
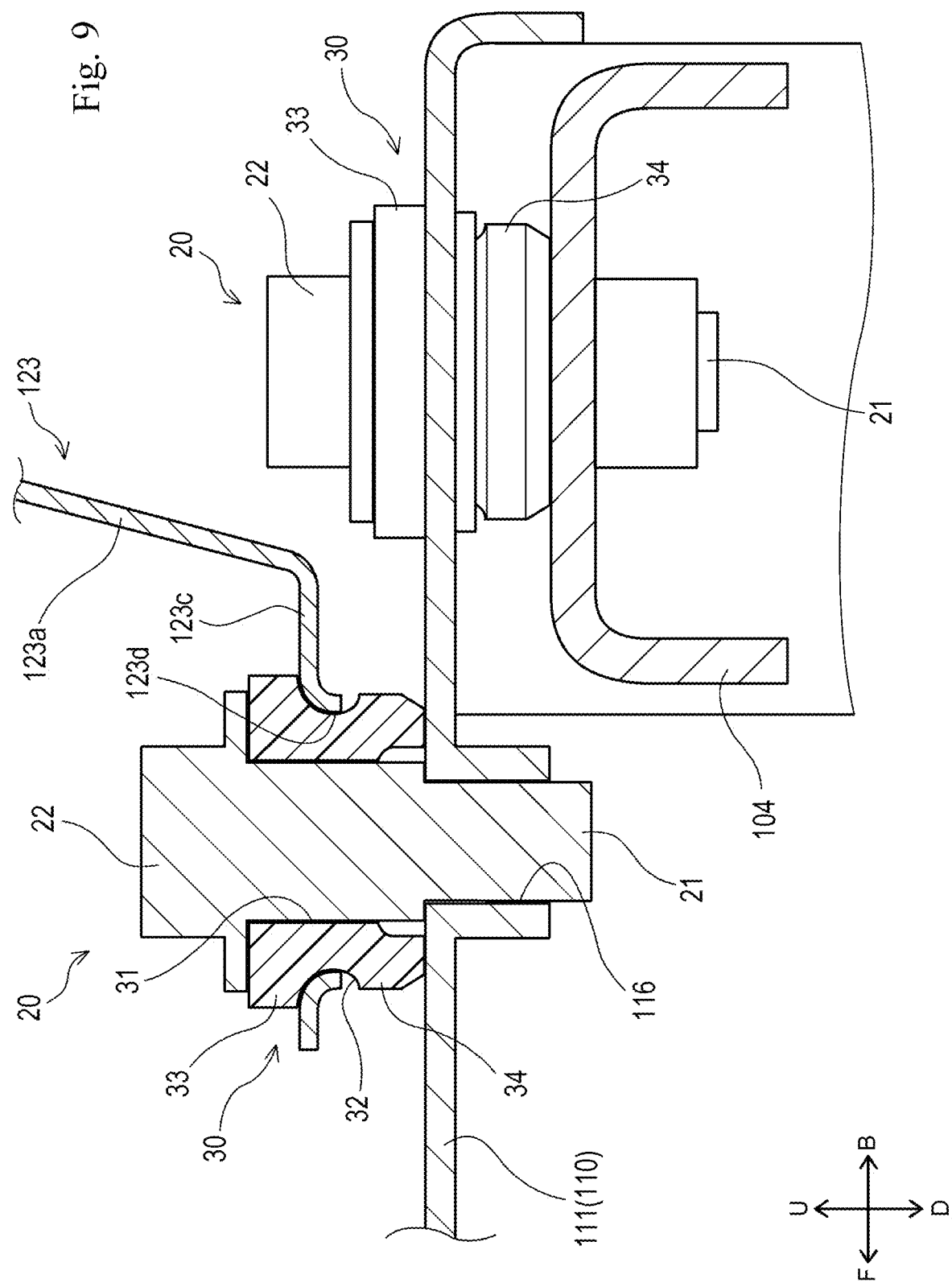
FIG. 9 is a side cross-sectional view showing how the seat base and the step are fixed.
Figure 11:
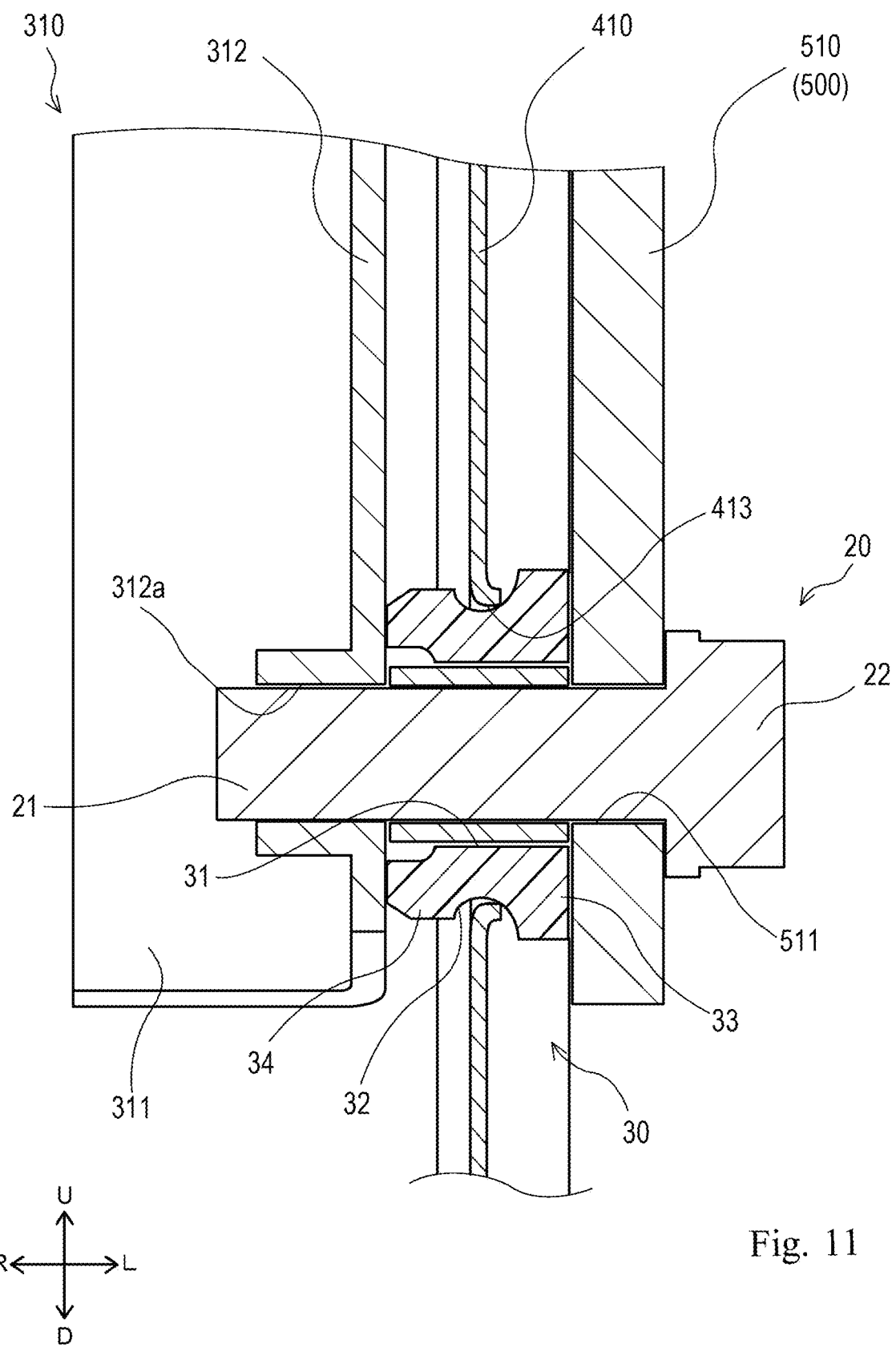
FIG. 11 is a side cross-sectional view showing how a ROPS, the fender, and a reinforcing portion are fixed.

The fasteners 20 shown in FIGS. 4, 9, and 11 can fix a plurality of members by being inserted through appropriate fixation holes (such as a fixation hole 123d shown in FIG. 9). Each fastener 20 includes a bolt capable of fastening a plurality of members. Various bolts such as hexagon head bolts or weld bolts may be used as the fasteners 20. Each fastener 20 includes a shaft portion 21 and a head portion 22.

The shaft portion 21 is a portion inserted through a fixation hole. An appropriate male screw portion is formed in the shaft portion 21.

The head portion 22 is a portion having a larger diameter than the shaft portion 21.

The vibration insulating portions 30 shown in FIGS. 4, 9, and 11 have a vibration insulating property. The vibration insulating portions 30 preferably have a substantially cylindrical shape. The vibration insulating portions 30 are formed of a material having flexibility such as rubber. The vibration insulating portions 30 are attached to (inserted through) fixation holes (such as the fixation hole 123d shown in FIG. 9) through which the fasteners 20 are inserted. Each vibration insulating portion 30 includes a hole 31, an insertion portion 32, a first increased diameter portion 33, and a second increased diameter portion 34.

The hole 31 is a portion through which the shaft portion of the fastener 20 is inserted. The hole 31 is formed to penetrate the vibration insulating portion 30 in the axial direction (the inserting direction of the fastener 20).

The insertion portion 32 is a portion inserted through the fixation hole to which the vibration insulating portion 30 is attached. The insertion portion 32 is an axially central portion of the vibration insulating portion 30.

The first increased diameter portion 33 is a portion defining one side of the vibration insulating portion 30 in the axial direction (the side on which the head portion 22 of the fastener 20 is located). The first increased diameter portion 33 has a larger diameter than the insertion portion 32.

The second increased diameter portion 34 is a portion defining the other side of the vibration insulating portion 30 in the axial direction (the side opposite to the head portion 22 in the axial direction). The second increased diameter portion 34 has a larger diameter than the insertion portion 32. The second increased diameter portion 34 preferably has a shape whose end portion on the other side in the axial direction gradually decreases in diameter toward its tip.

Next, the riding portion 100 will be described in detail with reference to FIGS. 1 to 9. As shown in FIG. 1, a steering wheel 9 for adjusting the steering angle of the front wheels 6 is disposed at a front portion of the riding portion 100. Various pedals are disposed on the floor portion of the riding portion 100 (steps 110, which will be described later). The riding portion 100 includes a step supporting portion 101, a seat base supporting portion 105, steps 110, a seat base 120, and a seat 130.

The step supporting portion 101 shown in FIGS. 4 and 5 supports the steps 110, which will be described later, from below. The step supporting portion 101 is provided to the transmission case 4.

The step supporting portion 101 includes a first step supporting portion 102, second step supporting portions 103, and third step supporting portions 104.

The first step supporting portion 102 supports front portions of the steps 110, which will be described later. The first step supporting portion 102 is longer in the lateral direction. The first step supporting portion 102 extends toward both lateral sides of the transmission case 4 (the clutch housing 4a). The first step supporting portion 102 is formed by appropriately combining a plate-shaped member whose thickness direction is in the forward-backward direction and a plate-shaped member whose thickness direction is in the vertical direction. The first step supporting portion 102 is provided on the upper surface of the clutch housing 4a. That is, the first step supporting portion 102 is provided to the transmission case 4 via the clutch housing 4a. The first step supporting portion 102 includes fixation holes 102a.

Figure 5:
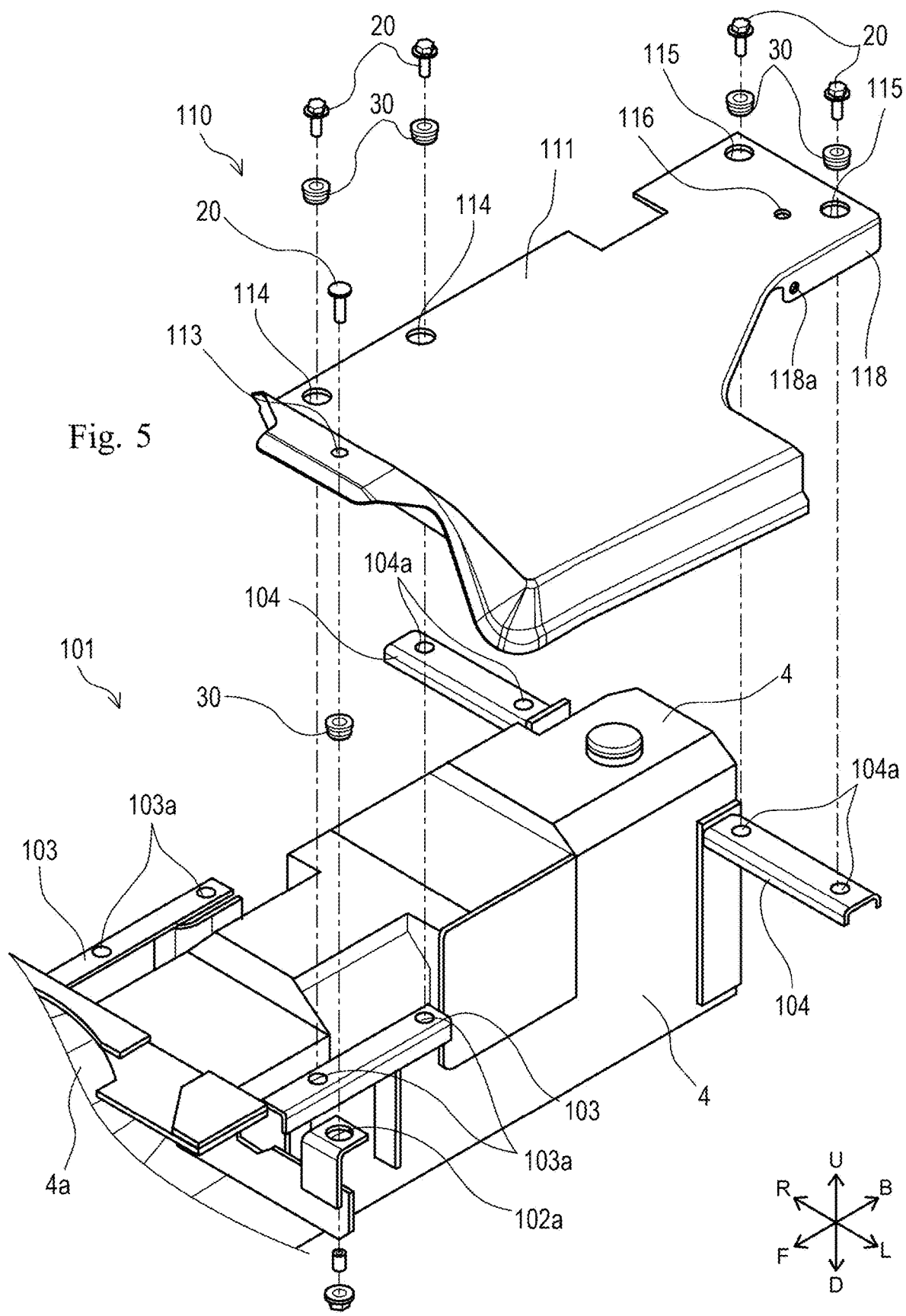
FIG. 5 is an enlarged exploded perspective view showing a step and the step supporting portion.

The fixation holes 102a shown in FIGS. 4 and 5 are used to fix the front portions of the steps 110, which will be described later. The fixation holes 102a are opened to penetrate the first step supporting portion 102 in the vertical direction. The fixation holes 102a are located at respective ones of both lateral end portions of the first step supporting portion 102. A vibration insulating portion 30 (insertion portion 32) is inserted through each fixation hole 102a. The inner diameter of the fixation hole 102a is larger than the outer diameter of the insertion portion 32 of the vibration insulating portion 30 and is smaller than the outer diameter of the first increased diameter portion 33 and the second increased diameter portion 34 of the vibration insulating portion 30.

The second step supporting portions 103 shown in FIGS. 4 and 5 support forward-backward middle portions of the steps 110, which will be described later. The second step supporting portions 103 are longer in the forward-backward direction. A pair of second step supporting portions 103 are located on the left and right sides of the transmission case 4. The second step supporting portions 103 are provided on side surfaces of a front portion of the transmission case 4. Each second step supporting portion 103 includes fixation holes 103a.

The fixation holes 103a shown in FIGS. 4 and 5 are used to fix the forward-backward middle portions of the steps 110, which will be described later. The fixation holes 103a are opened to penetrate the second step supporting portion 103 in the vertical direction. A pair of fixation holes 103a are located at a distance in the forward-backward direction in each second step supporting portion 103. Each fixation hole 103a includes therein a female screw portion for threaded engagement with the male screw portion provided to the shaft portion 21 of the fastener 20.

The third step supporting portions 104 support rear portions of the steps 110, which will be described later. The third step supporting portions 104 are longer in the lateral direction. A pair of third step supporting portions 104 are located on the left and right sides of the transmission case 4. The third step supporting portions 104 are provided on side surfaces of a rear portion of the transmission case 4. Each third step supporting portion 104 includes fixation holes 104a.

The fixation holes 104a are used to fix the rear portions of the steps 110, which will be described later. The fixation holes 104a are opened to penetrate the third step supporting portion 104 in the vertical direction. A pair of fixation holes 104a are located at a distance in the lateral direction in each third step supporting portion 104. Each fixation hole 104a includes therein a female screw portion for threaded engagement with the male screw portion provided to the shaft portion 21 of the fastener 20.

The seat base supporting portion 105 shown in FIGS. 6 and 7 supports the seat base 120, which will be described later, from below. The seat base supporting portion 105 is provided on the hydraulic case 5a. That is, the seat base supporting portion 105 is provided to the transmission case 4 via the hydraulic case 5a. The seat base supporting portion 105 includes a first seat base supporting portion 106 and second seat base supporting portions 107.

The first seat base supporting portion 106 shown in FIGS. 6 and 7 supports a front portion (first fixation frame 121) of the seat base 120, which will be described later. The first seat base supporting portion 106 is longer in the lateral direction. The first seat base supporting portion 106 is provided at a front portion of the hydraulic case 5a. The first seat base supporting portion 106 includes fixation holes 106a.

The fixation holes 106a are used to fix the front portion (first fixation frame 121) of the seat base 120, which will be described later. The fixation holes 106a are opened to penetrate the first seat base supporting portion 106 in the vertical direction. A pair of fixation holes 106a are located at a distance in the lateral direction. Each fixation hole 106a includes therein a female screw portion for threaded engagement with the male screw portion provided to the shaft portion 21 of the fastener 20.

The second seat base supporting portions 107 shown in FIGS. 6 and 7 support a rear portion (second fixation frame 122) of the seat base 120, which will be described later. A pair of second seat base supporting portions 107 are located on the left and right sides of the hydraulic case 5a. The second seat base supporting portions 107 are provided at a rear portion of the hydraulic case 5a. Each second seat base supporting portion 107 includes a fixation hole 107a.

The fixation hole 107a is used to fix the rear portion (second fixation frame 122) of the seat base 120, which will be described later. The fixation hole 107a is opened to penetrate the second seat base supporting portion 107 in the vertical direction. The fixation hole 107a includes therein a female screw portion for threaded engagement with the male screw portion provided to the shaft portion 21 of the fastener 20.

Figure 2:
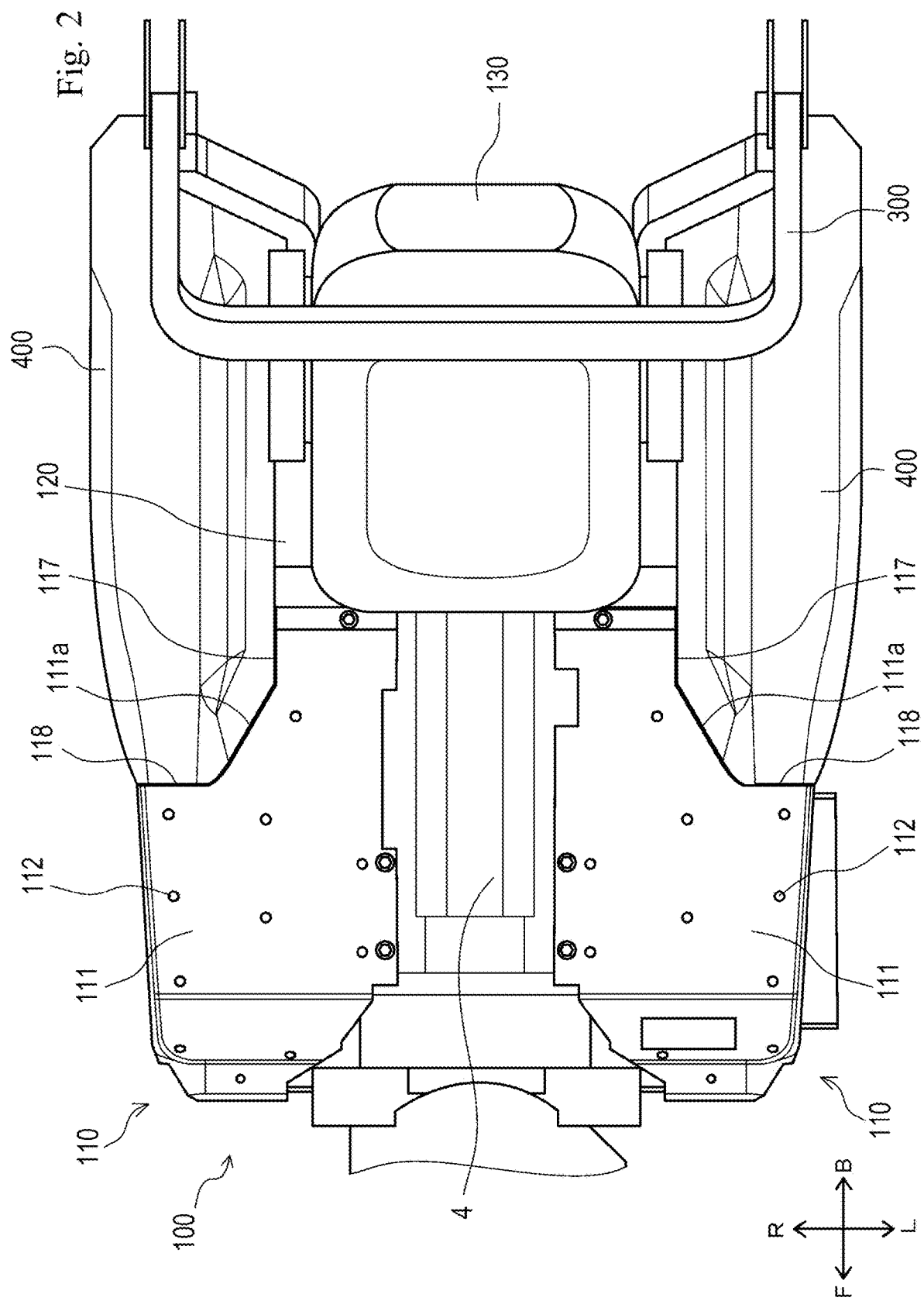
FIG. 2 is a plan view showing a driver's seat.

The steps 110 shown in FIGS. 2, 4, and 5 define the floor portion of the riding portion 100. A pair of steps 110 are provided on the left and right sides of the transmission case 4. The pair of steps 110 are generally symmetrical in the lateral direction. Each step 110 includes a main body 111, positioning holes 112, a first fixation hole 113, second fixation holes 114, third fixation holes 115, a fourth fixation hole 116, a first fixation piece portion 117, and a second fixation piece portion 118.

The main body 111 is a main structural body of the step 110. The main body 111 preferably has a substantially plate shape whose thickness direction is in the vertical direction. The main body 111 preferably has a substantially rectangular shape in a plan view (as seen in the thickness direction) as shown in FIG. 2. The main body 111 preferably has a shape that is appropriately bent such that its front portion is inclined upward. The main body 111 is supported by the step supporting portion 101 from below and fixed to the step supporting portion 101. The main body 111 includes a notch portion 111a.

The notch portions 111a shown in FIG. 2 include notching portions of the main bodies 111. The notch portions 111a are located at a rear portion of laterally outer portions of the main bodies 111 in a plan view. The notch portions 111a are structured to receive the left and right fenders 400.

Positioning protrusions (not shown) provided on a floor mat (not shown) laid on the upper surface of the steps 110 are inserted through the positioning holes 112 shown in FIG. 2. A plurality of positioning holes 112 penetrate the main bodies 111 in the thickness direction. Note that the positioning holes 112 are omitted as appropriate in the figures other than FIG. 2.

The first fixation hole 113 shown in FIGS. 4 and 5 is used for fixation to the first step supporting portion 102. The first fixation hole 113 is opened to penetrate the main body 111 in the vertical direction. The first fixation hole 113 is at a front portion of the main body 111.

The first fixation hole 113 overlaps a fixation hole 102*a* of the first step supporting portion 102 in a plan view.

The second fixation holes 114 shown in FIGS. 4 and 5 are used for fixation to the second step supporting portion 103. The second fixation holes 114 are opened to penetrate the main body 111 in the vertical direction. The second fixation holes 114 are located at a forward-backward middle portion of the main body 111. A pair of second fixation holes 114 are located at a distance in the forward-backward direction. The second fixation holes 114 overlap the fixation holes 103*a* of the second step supporting portion 103 in a plan view. A vibration insulating portion 30 is inserted through each second fixation hole 114. The inner diameter of the second fixation hole 114 is larger than the outer diameter of the insertion portion 32 of the vibration insulating portion 30 and is smaller than the outer diameter of the first increased diameter portion 33 and the second increased diameter portion 34 of the vibration insulating portion 30.

The third fixation holes 115 shown in FIGS. 4 and 5 are used for fixation to the third step supporting portion 104. The third fixation holes 115 are opened to penetrate the main body 111 in the vertical direction. The third fixation holes 115 are located at a rear portion of the main body 111. A pair of third fixation holes 115 are located at a distance in the lateral direction. The third fixation holes 115 overlap the fixation holes 104*a* of the third step supporting portion 104 in a plan view. A vibration insulating portion 30 is inserted through each third fixation hole 115. The inner diameter of the third fixation hole 115 is larger than the outer diameter of the insertion portion 32 of the vibration insulating portion 30 and is smaller than the outer diameter of the first increased diameter portion 33 and the second increased diameter portion 34 of the vibration insulating portion 30.

Figure 8:
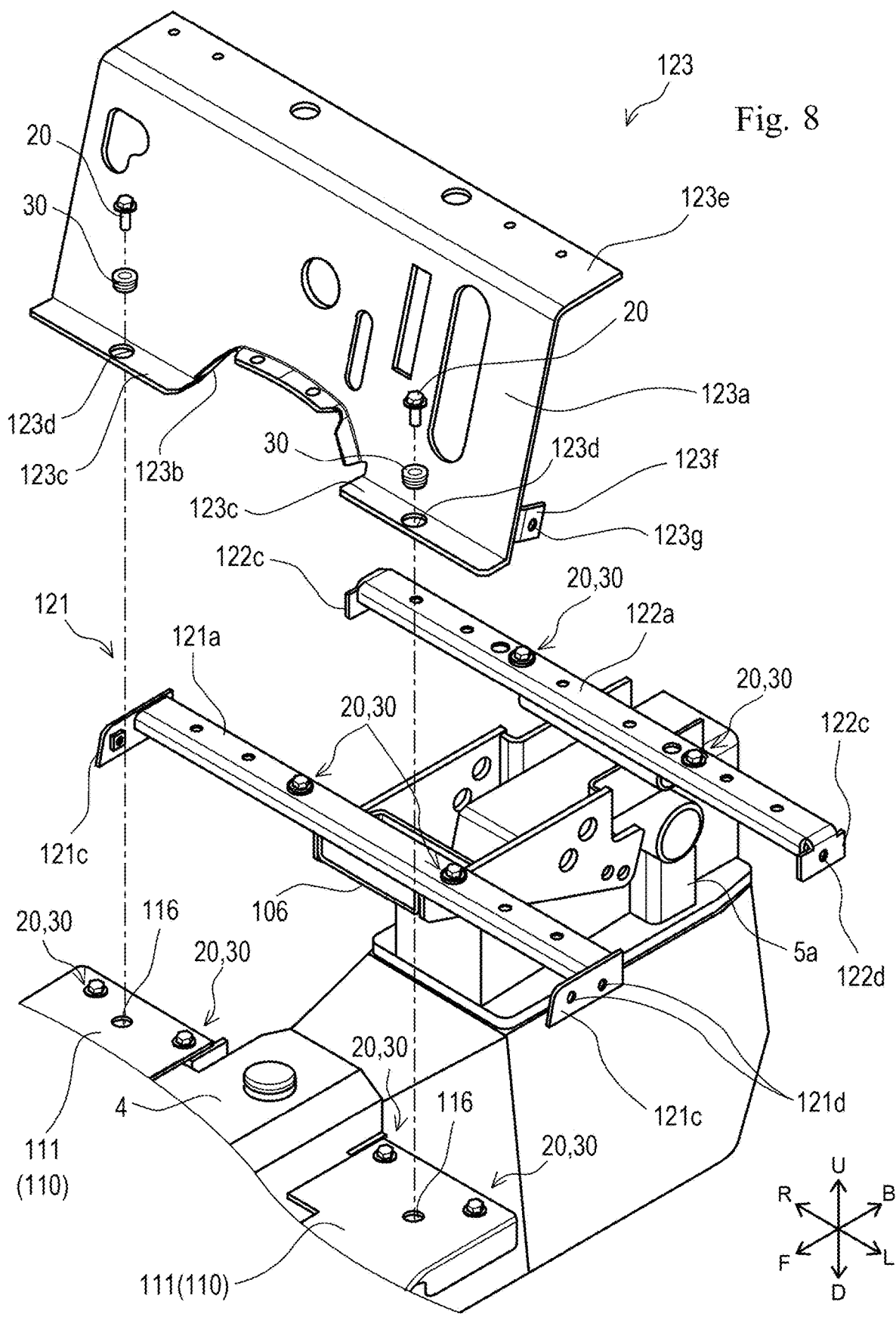
FIG. 8 is an enlarged exploded perspective view showing the seat base and the steps.

The fourth fixation hole 116 shown in FIGS. 5 and 8 is used to fix the seat base 120 (a front wall portion 123), which will be described later. The fourth fixation hole 116 is opened to penetrate the main body 111 in the vertical direction. The fourth fixation hole 116 is forward of the third fixation holes 115 at a rear portion of the main body 111. The fourth fixation hole 116 includes therein a female screw portion for threaded engagement with the male screw portion provided to the shaft portion 21 of the fastener 20.

Figure 13:
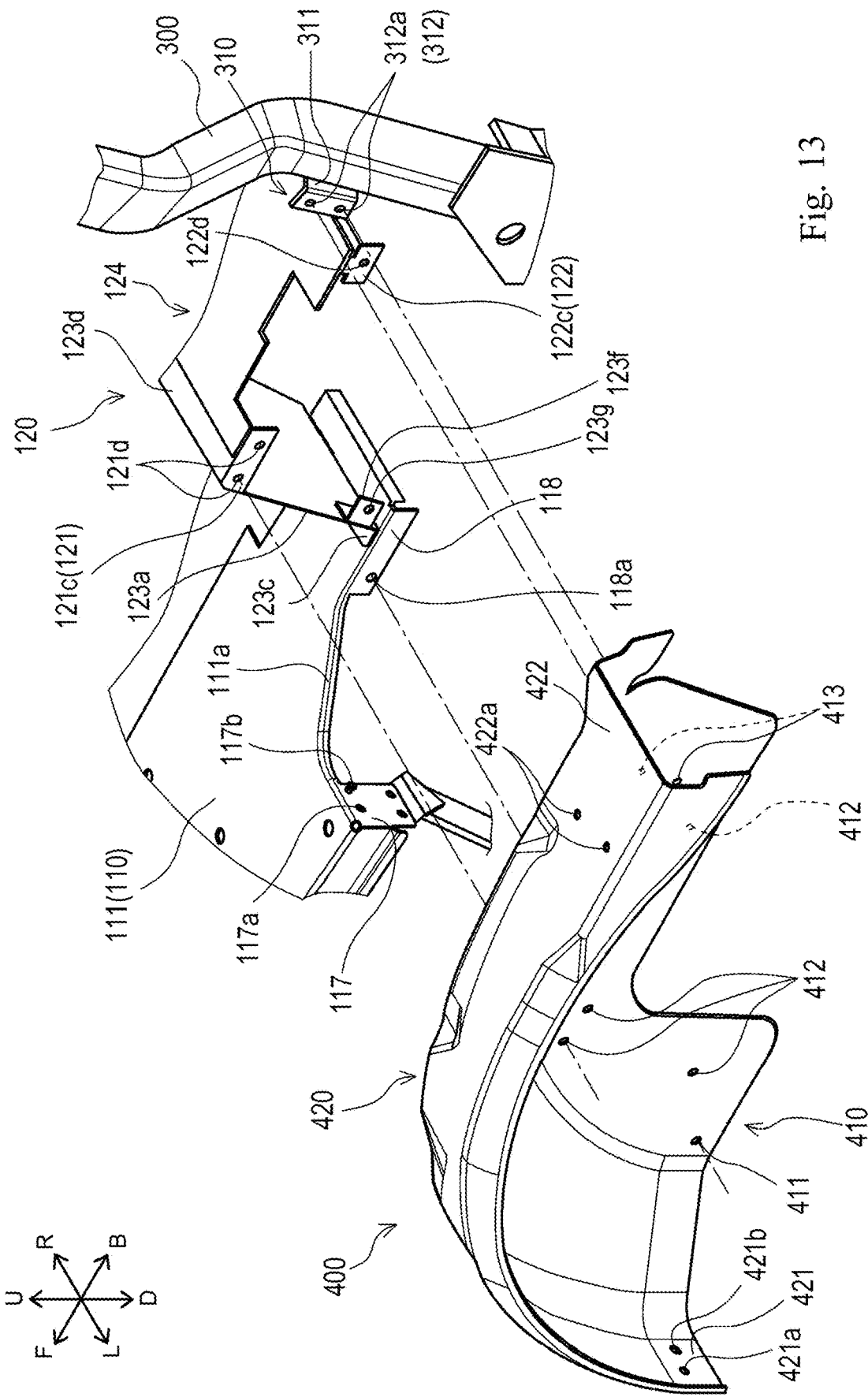
FIG. 13 is a rear exploded perspective view showing the driver's seat and the fender.

The first fixation piece portion 117 shown in FIGS. 13 and 14 is a portion for fixing a front portion of the fender 400 at a portion of the notch portion 111*a* facing backward. The first fixation piece portion 117 extends downward from the portion of the notch portion 111*a* facing backward. The first fixation piece portion 117 preferably has a substantially plate shape whose thickness direction is in the forward-backward direction. The first fixation piece portion 117 preferably has a rectangular shape in a rear view. The first fixation piece portion 117 includes a fixation hole 117*a* and a positioning protrusion 117*b*.

The fixation hole 117*a* shown in FIG. 14 is used to fix a front portion of the fender 400. The fixation hole 117*a* is opened to penetrate the first fixation piece portion 117 in the forward-backward direction. An appropriate fastener is inserted through the fixation hole 117*a*.

The positioning protrusion 117*b* is used to position the fender 400. The positioning protrusion 117*b* protrudes backward from the rear surface of the first fixation piece portion 117. The positioning protrusion 117*b* is provided on the inner side relative to the fixation hole 117*a* in the lateral direction. The positioning protrusion 117*b* includes a shaft portion 117*c* and a head portion 117*d*.

The shaft portion 117*c* is a portion protruding from the rear surface of the first fixation piece portion 117. The shaft portion 117*c* preferably has a substantially columnar shape whose axial direction is in the forward-backward direction.

The head portion 117*d* is a portion provided at the tip of the shaft portion 117*c*. The head portion 117*d* preferably has a shape having a larger diameter than the shaft portion 117*c*. The head portion 117*d* preferably has a substantially disc shape whose thickness direction is in the axial direction.

The second fixation piece portion 118 shown in FIGS. 5 and 13 is a portion for fixing a side portion of the fender 400 at a portion of the notch portion 111*a* facing sideward. The second fixation piece portion 118 extends downward from the portion of the notch portion 111*a* facing sideward. The second fixation piece portion 118 preferably has a substantially plate shape whose thickness direction is in the lateral direction. The second fixation piece portion 118 preferably has a rectangular shape in a side view. The second fixation piece portion 118 includes a fixation hole 118*a*.

The fixation hole 118*a* is used to fix the side portion of the fender 400. The fixation hole 118*a* is opened to penetrate the second fixation piece portion 118 in the lateral direction. An appropriate fastener is inserted through the fixation hole 118*a*.

The following will describe the manner of fixing the step supporting portion 101 and the steps 110 to each other with reference to FIGS. 4 and 5.

As shown in FIGS. 4 and 5, the shaft portions 21 of fasteners 20 are inserted through the first fixation holes 113 of the steps 110 and the holes 31 of vibration insulating portions 30 attached to the fixation holes 102*a* of the first step supporting portions 102, and appropriate nuts located below the first step supporting portion 102 are threadedly engaged with the shaft portions 21. Note that appropriate cylindrical collars are interposed between the shaft portions 21 of the fasteners 20 and the holes 31 of the vibration insulating portions 30.

In addition, the shaft portions 21 of fasteners 20 are inserted through the holes 31 of vibration insulating portions 30 attached to the second fixation holes 114 of the steps 110, and the shaft portions 21 are threadedly engaged with the fixation holes 103*a* of the second step supporting portions 103. In addition, the shaft portions 21 of fasteners 20 are inserted through the holes 31 of vibration insulating portions 30 attached to the third fixation holes 115 of the steps 110, and the shaft portions 21 are threadedly engaged with the fixation holes 104*a* of the third step supporting portions 104. The steps 110 are thus fixed to the step supporting portion 101.

The seat 130, which will be described later, is installed on the seat base 120 shown in FIGS. 3 and 6 to 8. The seat base 120 is provided behind the steps 110 in the riding portion 100. The seat base 120 is formed such that its upper surface (the upper surface of a placing portion 124, which will be described later) is located above the upper surface of the main bodies 111 of the steps 110. In other words, the seat base 120 is located at a greater height than the main bodies 111 of the steps 110. The seat base 120 includes a first fixation frame 121, a second fixation frame 122, a front wall portion 123, and a placing portion 124.

Figure 6:
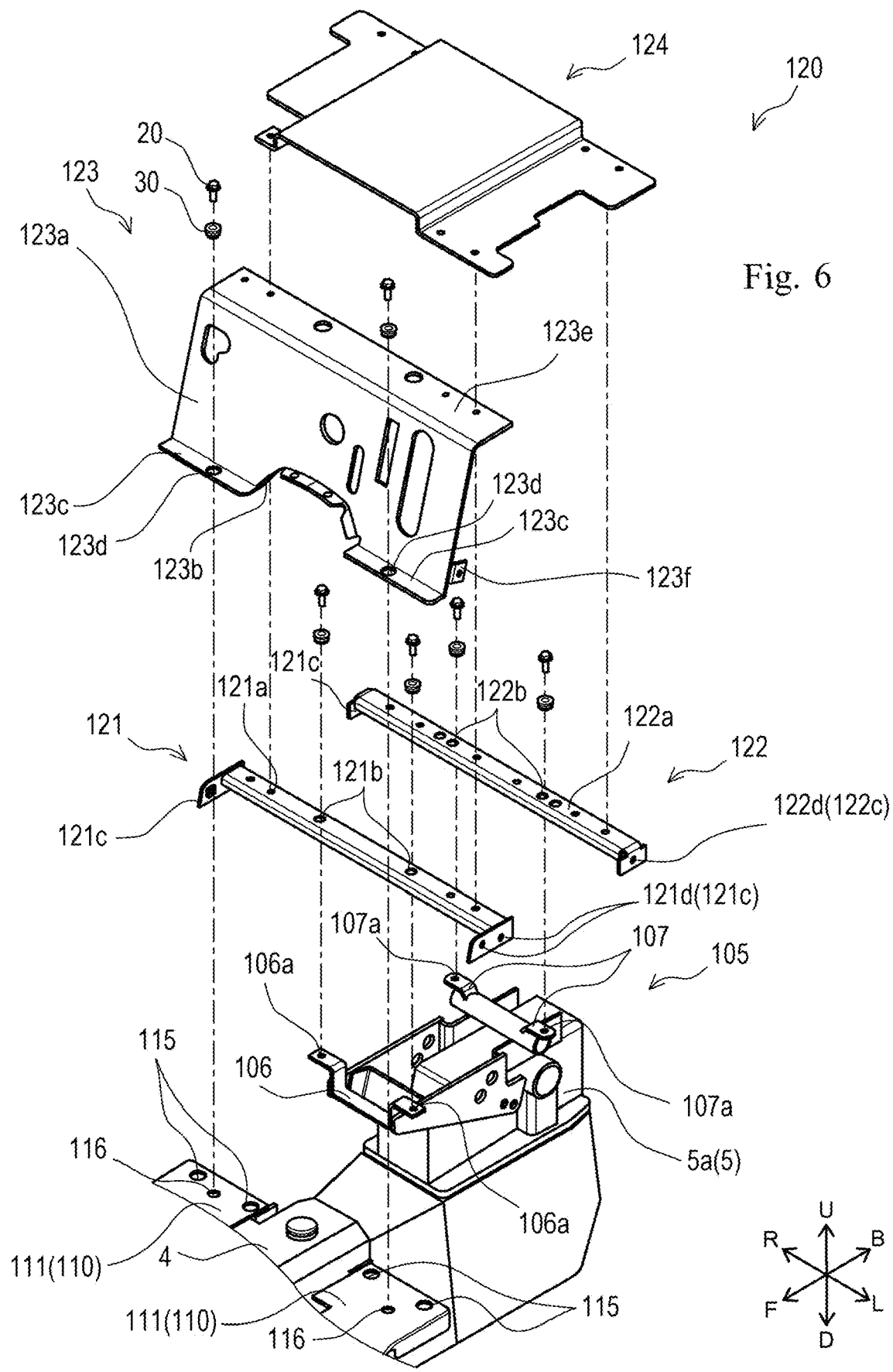
FIG. 6 is an exploded perspective view showing a seat base and a seat base supporting portion.
Figure 7:
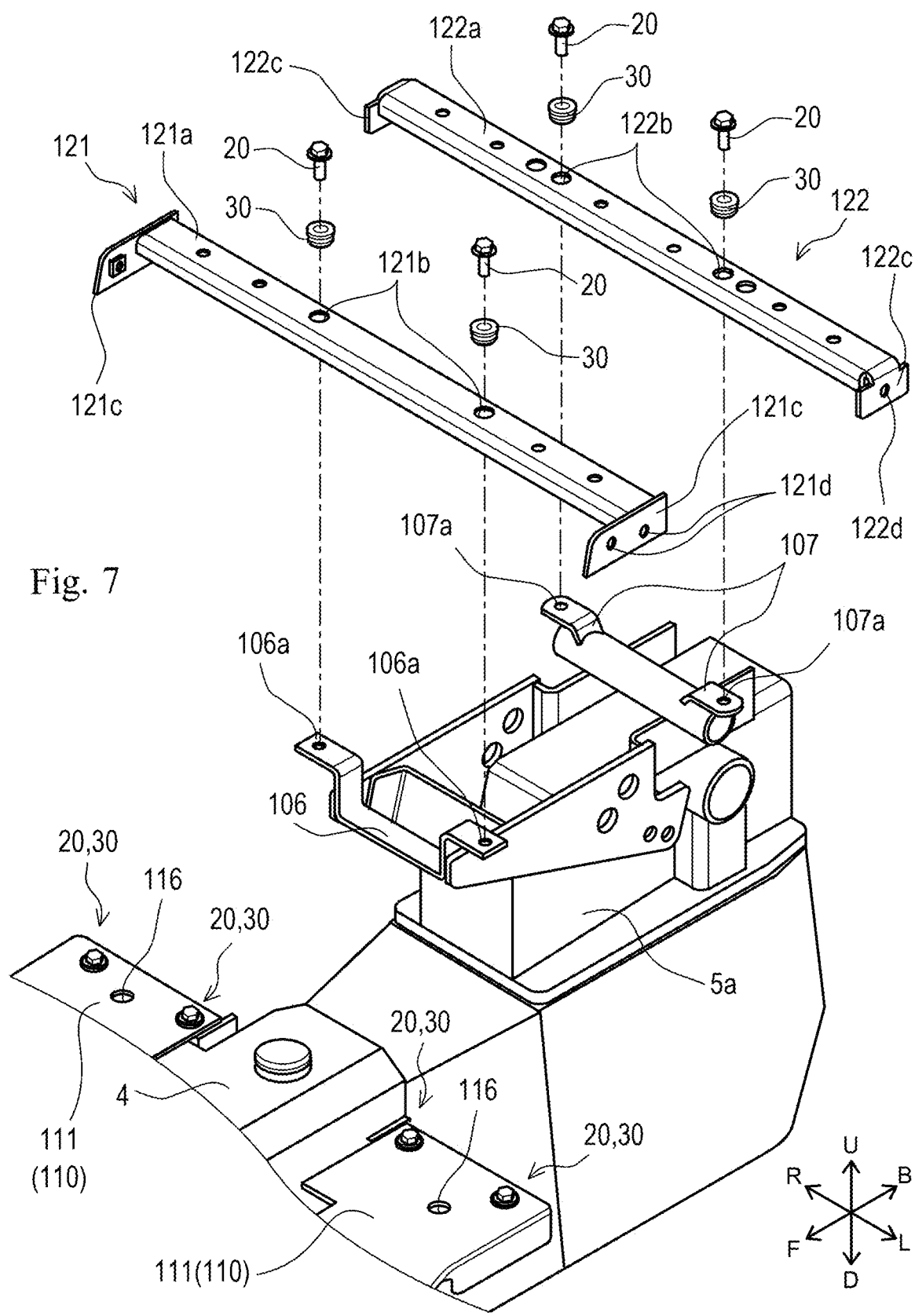
FIG. 7 is an enlarged exploded perspective view showing the seat base and the seat base supporting portion.

The first fixation frame 121 shown in FIGS. 6 to 8 is fixed to the first seat base supporting portion 106. The fenders 400 are fixed to the first fixation frame 121. The first fixation frame 121 includes a main body 121a and fender fixing portions 121c.

The main body 121a is a main structural body of the first fixation frame 121. The main body 121a is longer in the lateral direction. The main body 121a includes fixation holes 121b.

The fixation holes 121b are used for fixation to the first seat base supporting portion 106. The fixation holes 121b are opened to penetrate the main body 121a in the vertical direction. A pair of fixation holes 121b are located at a distance in the lateral direction. The fixation holes 121b overlap the fixation holes 106a of the first seat base supporting portion 106 in a plan view. A vibration insulating portion 30 is inserted through each fixation hole 121b. The inner diameter of the fixation hole 121b is larger than the outer diameter of the insertion portion 32 of the vibration insulating portion 30 and is smaller than the outer diameter of the first increased diameter portion 33 and the second increased diameter portion 34 of the vibration insulating portion 30.

The fender fixing portions 121c are portions to which side portions of the fenders 400 are fixed. The fender fixing portions 121c preferably have a substantially plate shape whose thickness direction is in the lateral direction. The fender fixing portions 121c are provided at respective ones of both lateral end portions of the main body 121a. Each fender fixing portion 121c includes fixation holes 121d.

The fixation holes 121d are used to fix the side portion of the fender 400. The fixation holes 121d are opened to penetrate the fender fixing portion 121c in the lateral direction. A pair of fixation holes 121d are located at a distance in the forward-backward direction. Appropriate fasteners are inserted through the fixation holes 121d.

The second fixation frame 122 shown in FIGS. 6 to 8 is fixed to the second seat base supporting portion 107. The fenders 400 are fixed to the second fixation frame 122. The second fixation frame 122 includes a main body 122a and fender fixing portions 122c.

The main body 122a is a main structural body of the second fixation frame 122. The main body 122a is longer in the lateral direction. The main body 122a includes fixation holes 122b.

The fixation holes 122b are used for fixation to the second seat base supporting portion 107. The fixation holes 122b are opened to penetrate the main body 122a in the vertical direction. A pair of fixation holes 122b are located at a distance in the lateral direction. The fixation holes 122b overlap the fixation holes 107a of the second seat base supporting portion 107 in a plan view. A vibration insulating portion 30 is inserted through each fixation hole 122b. The inner diameter of the fixation hole 122b is larger than the outer diameter of the insertion portion 32 of the vibration insulating portion 30 and is smaller than the outer diameter of the first increased diameter portion 33 and the second increased diameter portion 34 of the vibration insulating portion 30.

The fender fixing portions 122c are portions to which side portions of the fenders 400 are fixed. The fender fixing portions 122c preferably have a substantially plate shape whose thickness direction is in the lateral direction. The fender fixing portions 122c are provided at respective ones of both lateral end portions of the main body 122a. Each fender fixing portion 122c includes a fixation hole 122d.

The fixation hole 122d is used to fix the side portion of the fender 400. The fixation hole 122d is opened to penetrate the fender fixing portion 122c in the lateral direction. An appropriate fastener is inserted through the fixation hole 122d.

The front wall portion 123 shown in FIGS. 6, 8, and 9 defines the front surface of the seat base 120. The front wall portion 123 is disposed to bridge between the pair of steps 110. The front wall portion 123 is disposed above the steps 110 (the main bodies 111). The front wall portion 123 is fixed to the rear end portions of the steps 110 (the main bodies 111) and the first fixation frame 121. The front wall portion 123 includes a main body 123a, lower fixing portions 123c, an upper fixing portion 123e, and fender fixing portions 123f.

The main body 123a shown in FIGS. 6 and 8 is a main structural body of the front wall portion 123. The main body 123a preferably has a substantially plate shape whose thickness direction is in the forward-backward direction. The main body 123a includes a recess 123b.

The recess 123b opens downward to receive an upper portion of the transmission case 4. The recess 123b is located at a laterally central portion of the lower end of the main body 123a.

The lower fixing portions 123c shown in FIGS. 8 and 9 are portions fixed to the rear end portions of the main bodies 111 of the steps 110. The lower fixing portions 123c protrude forward from the lower end of the main body 123a. The lower fixing portions 123c preferably have a substantially plate shape whose thickness direction is in the vertical direction. A pair of lower fixing portions 123c are located on both the left and right sides of the recess 123b. Each lower fixing portion 123c includes a fixation hole 123d.

The fixation holes 123d are used for fixation to the main bodies 111 of the steps 110. The fixation holes 123d are opened to penetrate the lower fixing portions 123c in the vertical direction. The fixation holes 123d overlap the fourth fixation holes 116 of the steps 110 in a plan view. As shown in FIG. 9, a vibration insulating portion 30 is inserted through each fixation hole 123d. The inner diameter of the fixation hole 123d is larger than the outer diameter of the insertion portion 32 of the vibration insulating portion 30 and is smaller than the outer diameter of the first increased diameter portion 33 and the second increased diameter portion 34 of the vibration insulating portion 30.

The upper fixing portion 123e shown in FIGS. 6 and 8 is a portion fixed to the first fixation frame 121. The upper fixing portion 123e protrudes backward from the upper end portion of the main body 123a. The upper fixing portion 123e preferably has a substantially plate shape whose thickness direction is in the vertical direction. The upper fixing portion 123e is placed on the upper surface of the first fixation frame 121. The upper fixing portion 123e includes therein an appropriate hole opened to penetrate the upper fixing portion 123e in the vertical direction and used for fixation to the first fixation frame 121.

The fender fixing portions 123f shown in FIG. 8 are portions to which side portions of the fenders 400 are fixed. The fender fixing portions 123f protrude backward from laterally outer end portions of a lower-side portion of the main body 123a. The fender fixing portions 123f preferably have a substantially plate shape whose thickness direction is in the lateral direction. The fender fixing portions 123f are provided at respective ones of both lateral end portions of the main body 123a. Each fender fixing portion 123f includes a fixation holes 123g.

The fixation hole 123g is used to fix the side portion of the fender 400. The fixation hole 123g is opened to penetrate the fender fixing portion 123f in the lateral direction. An appropriate fastener is inserted through the fixation hole 123g.

Figure 3:
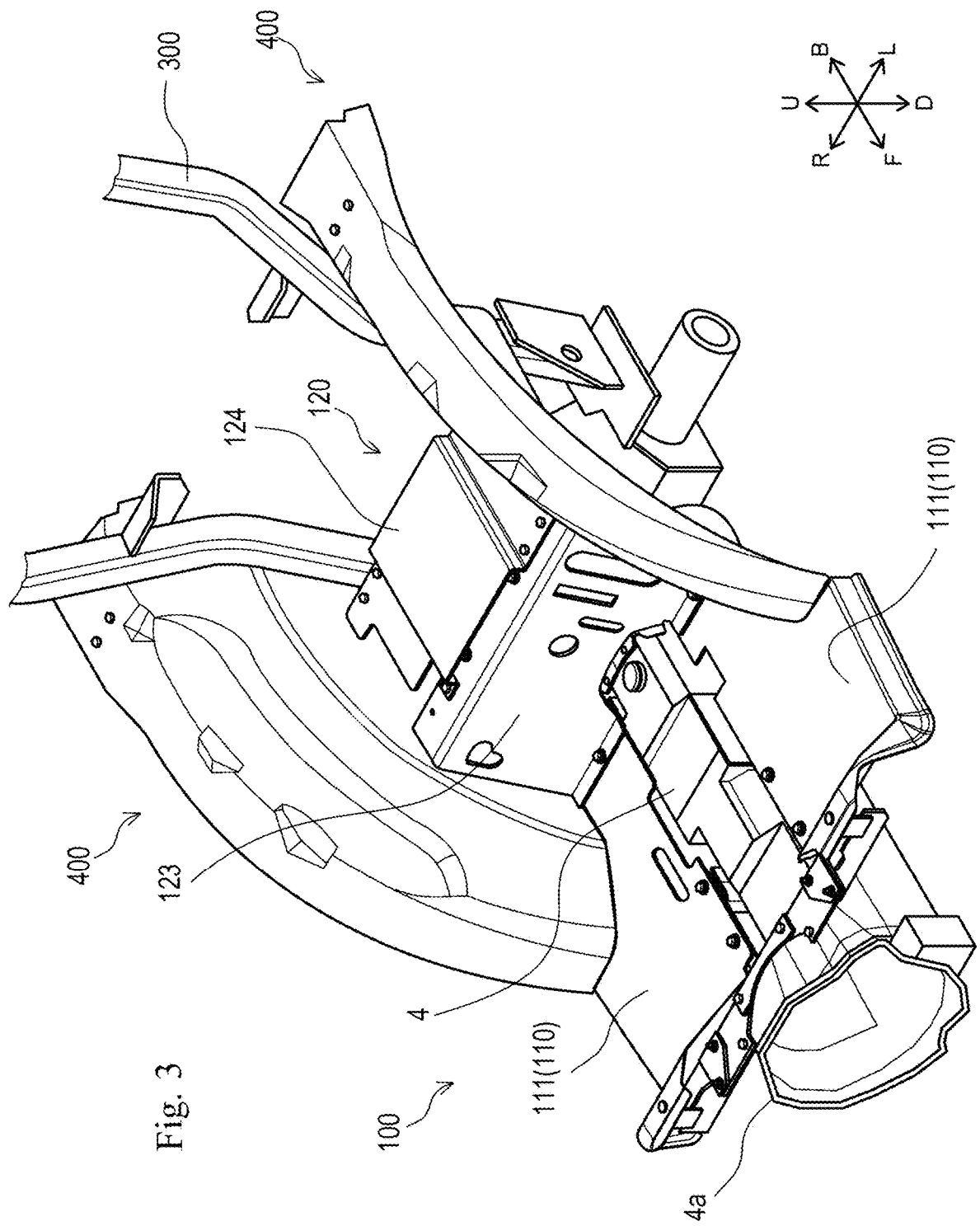
FIG. 3 is a perspective view showing the driver's seat.

The placing portion 124 shown in FIGS. 3 and 6 defines the upper surface of the seat base 120. The placing portion 124 preferably has a substantially plate shape whose thickness direction is in the vertical direction. As shown in FIG. 6, the placing portion 124 is disposed to bridge between the upper fixing portion 123e of the front wall portion 123 (the first fixation frame 121) and the second fixation frame 122. The placing portion 124 includes therein appropriate holes opened to penetrate the placing portion 124 in the vertical direction. The placing portion 124 is fixed to the upper fixing portion 123e (the first fixation frame 121) and the second fixation frame 122 using fasteners inserted through the above-mentioned holes.

The following will describe the manner of fixing the seat base supporting portion 105 and the seat base 120 to each other and the manner of fixing the steps 110 and the seat base 120 to each other with reference to FIGS. 6 to 9.

As shown in FIGS. 6 and 7, the shaft portions 21 of fasteners 20 are inserted through the holes 31 of vibration insulating portions 30 attached to the fixation holes 121b of the first fixation frame 121, and the shaft portions 21 are threadedly engaged with the fixation holes 106a of the first seat base supporting portion 106. In addition, the shaft portions 21 of fasteners 20 are inserted through the holes 31 of vibration insulating portions 30 attached to the fixation holes 122b of the second fixation frame 122, and the shaft portions 21 are threadedly engaged with the fixation holes 107a of the second seat base supporting portions 107. The first fixation frame 121 and the second fixation frame 122 are thus fixed to the seat base supporting portion 105.

In addition, as shown in FIGS. 8 and 9, the shaft portions 21 of fasteners 20 are inserted through the holes 31 of vibration insulating portions 30 attached to the fixation holes 123d of the front wall portion 123 (the lower fixing portions 123c), and the shaft portions 21 are threadedly engaged with the fourth fixation holes 116 of the steps 110. The front wall portion 123 is thus fixed to the steps 110.

In addition, as shown in FIG. 6, by inserting appropriate fasteners (not shown) through appropriate holes formed in respective ones of the first fixation frame 121, the upper fixing portion 123e of the front wall portion 123, and the placing portion 124 and fastening the front wall portion 123 and the placing portion 124 to the first fixation frame 121, the front wall portion 123 and the placing portion 124 are fixed to the first fixation frame 121. In addition, by inserting appropriate fasteners (not shown) through appropriate holes formed in the second fixation frame 122 and the placing portion 124 and fastening the placing portion 124 to the second fixation frame 122, the placing portion 124 is fixed to the second fixation frame 122. The seat base 120 is fixed to the seat base supporting portion 105 and the steps 110 in the above-described manner.

A driver sits on the seat 130 shown in FIGS. 1 and 2. The seat 130 is fixed on the upper surface of the placing portion 124 of the seat base 120.

Next, the ROPS 300 will be described in detail with reference to FIGS. 1, 3, and 13. As shown in FIG. 3, a pair of lower-side portions of the ROPS 300 are provided to extend upward from both the left and right sides of the transmission case 4. The lower-side portions of the ROPS 300 are fixed to respective ones of both the left and right sides of the transmission case 4. The ROPS 300 includes fixing portions 310.

Figure 17:
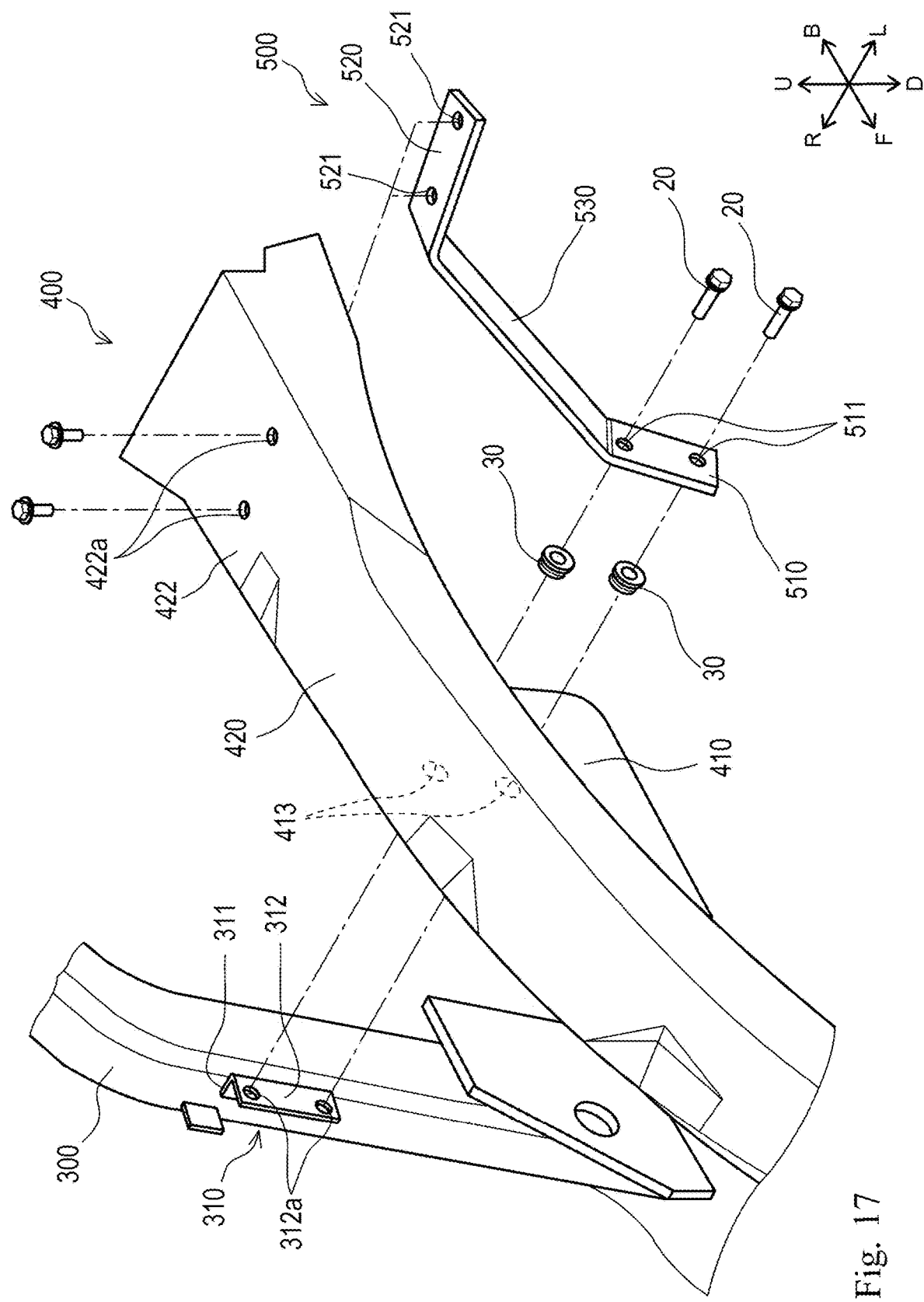
FIG. 17 is an exploded perspective view showing the ROPS, the fender, and the reinforcing portion.

Side portions of the fenders 400 are fixed to the fixing portions 310 shown in FIGS. 13 and 17. The fixing portions 310 are provided to respective ones of the pair of lower-side portions of the ROPS 300. Each fixing portion 310 includes a first fixation piece portion 311 and a second fixation piece portion 312.

The first fixation piece portion 311 is a portion fixed to a lower-side portion of the ROPS 300. The first fixation piece portion 311 preferably has a substantially plate shape whose thickness direction is in the forward-backward direction. The first fixation piece portion 311 is fixed on the front surface of the lower-side portion of the ROPS 300 such as by welding.

The second fixation piece portion 312 is a portion to which a side portion of the fender 400 is fixed. The second fixation piece portion 312 preferably has a substantially plate shape whose thickness direction is in the lateral direction. The second fixation piece portion 312 extends forward from a laterally outer end portion of the first fixation piece portion 311. The second fixation piece portion 312 includes fixation holes 312a.

The fixation holes 312a are used to fix the side portion of the fender 400. The fixation hole 312a are opened to penetrate the second fixation piece portion 312 in the lateral direction. A pair of fixation holes 312a are located at a distance in the vertical direction. Each fixation hole 312a includes therein a female screw portion for threaded engagement with the male screw portion provided to the shaft portion 21 of the fastener 20.

Next, the fenders 400 will be described in detail with reference to FIGS. 10 to 16. The fenders 400 cover radially outer portions and laterally inner portions of the rear wheels 7. The fenders 400 are fixed to the steps 110, the seat base 120, and the ROPS 300. Each fender 400 includes a first portion 410 and a second portion 420.

Figure 10:
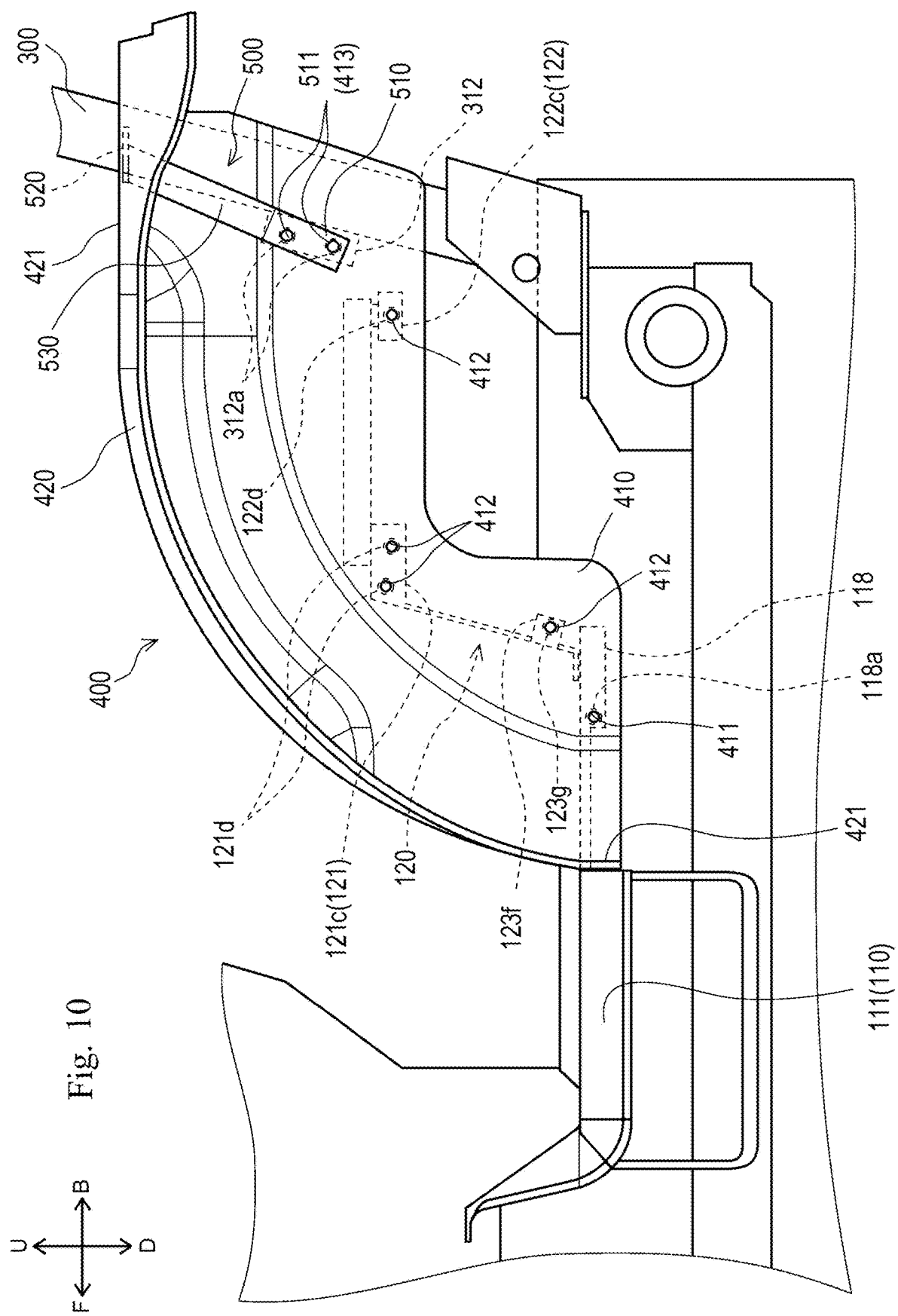
FIG. 10 is a side view showing the driver's seat and a fender.
Figure 12:
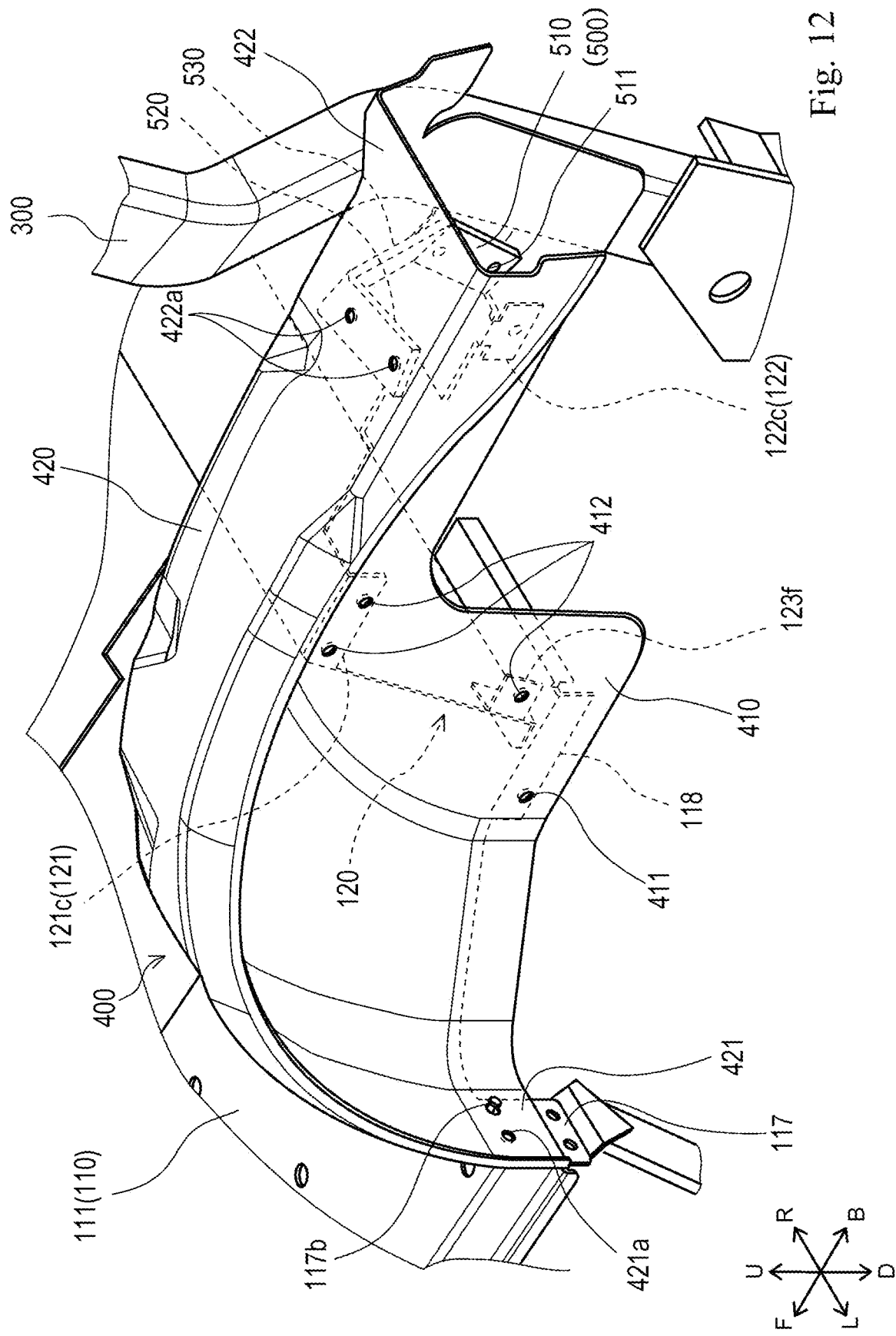
FIG. 12 is a rear perspective view showing the driver's seat and the fender.

The first portion 410 shown in FIGS. 10, 12, and 13 is a portion covering the laterally inner portion of the rear wheel 7. The first portion 410 is fixed to the steps 110, the seat base 120, and the ROPS 300. The first portion 410 preferably has a substantially plate shape whose thickness direction is in the lateral direction. The first portion 410 includes a first fixation hole 411, second fixation holes 412, and third fixation holes 413.

The first fixation hole 411 shown in FIGS. 10, 12, and 13 is used for fixation to the second fixation piece portion 118 of the step 110. The first fixation hole 411 is opened to penetrate the first portion 410 in the lateral direction. The first fixation hole 411 is located at a position facing the second fixation piece portion 118 of the step 110. The first fixation hole 411 overlaps the fixation hole 118a of the second fixation piece portion 118 in a side view. An appropriate fastener is inserted through the first fixation hole 411.

The second fixation holes 412 shown in FIGS. 10, 12, and 13 are used for fixation to the first fixation frame 121, the second fixation frame 122, and the front wall portion 123 of the seat base 120. The second fixation holes 412 are opened to penetrate the first portion 410 in the lateral direction. The second fixation holes 412 are located at positions facing the fender fixing portion 121c, the fender fixing portion 122c, and the fender fixing portion 123f. A plurality of second fixation holes 412 overlap respective ones of the fixation holes 121d of the first fixation frame 121, the fixation hole 122d of the second fixation frame 122, and the fixation hole 123g of the front wall portion 123 in a side view. Appropriate fasteners are inserted through the second fixation holes 412.

The third fixation holes 413 shown in FIGS. 10, 12, and 13 are used for fixation to the fixing portion 310 (the second fixation piece portion 312) of the ROPS 300. The third fixation holes 413 are opened to penetrate the first portion 410 in the lateral direction. A pair of third fixation holes 413 are located at a distance in the vertical direction. The third fixation holes 413 are located at positions facing the second fixation piece portion 312. The third fixation holes 413 overlap the fixation holes 312a of the second fixation piece portion 312 in a side view. A vibration insulating portion 30 is inserted through each third fixation hole 413 as shown in FIG. 11. The inner diameter of the third fixation hole 413 is larger than the outer diameter of the insertion portion 32 of the vibration insulating portion 30 and is smaller than the outer diameter of the first increased diameter portion 33 and the second increased diameter portion 34 of the vibration insulating portion 30.

The second portion 420 shown in FIGS. 10 and 12 to 16 is a portion covering the radially outer portion of the rear wheel 7. The second portion 420 is fixed to the step 110. The second portion 420 preferably has a substantially plate shape whose thickness direction is in the radial direction of the rear wheel 7. The second portion 420 includes a step fixing portion 421 and a reinforcing portion fixing portion 422.

Figure 16:
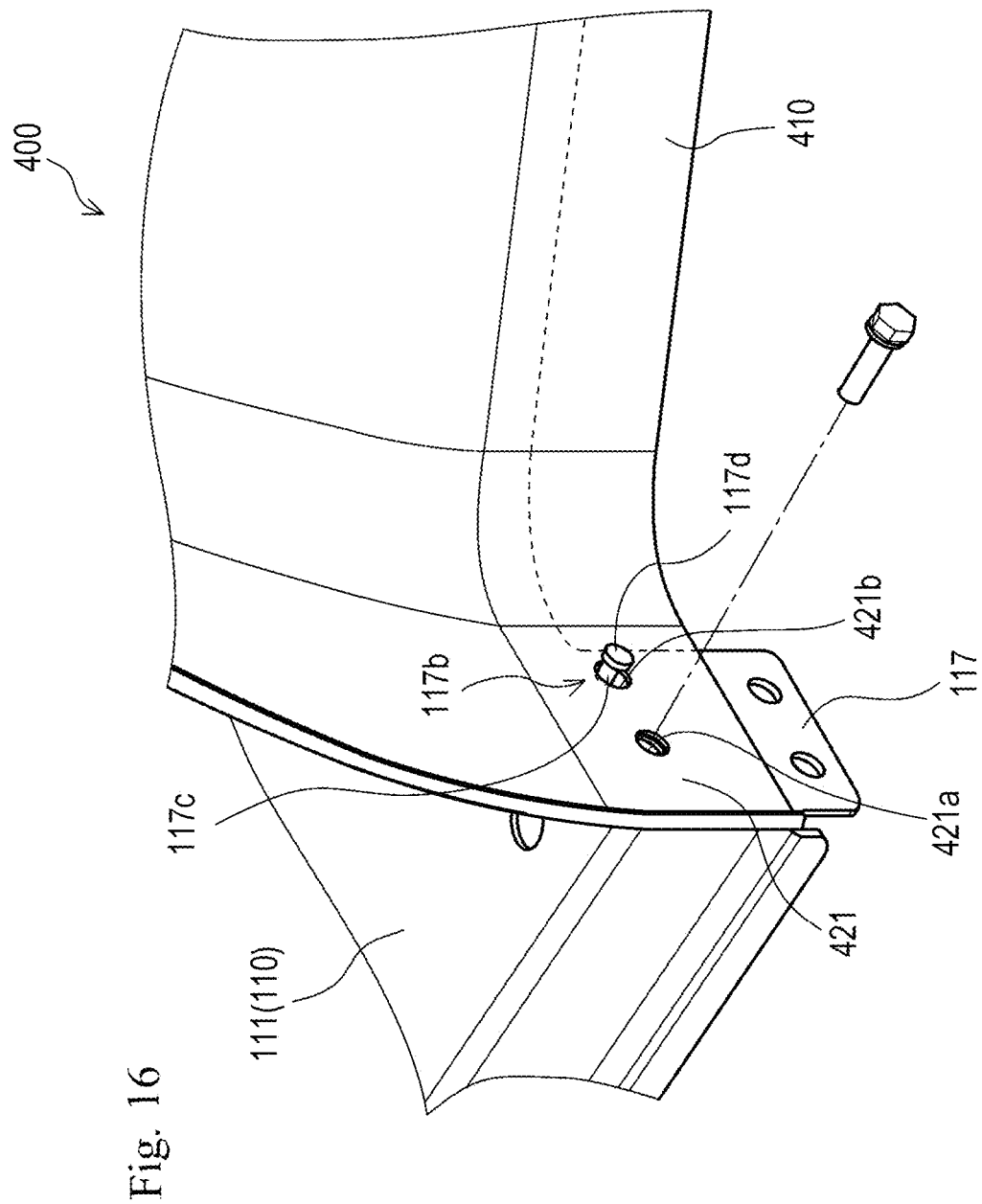
FIG. 16 is an enlarged perspective view showing the step and the fender.

The step fixing portion 421 shown in FIGS. 12 to 16 is a portion facing the first fixation piece portion 117 of the step 110 and fixed to the first fixation piece portion 117. The step fixing portion 421 defines a front portion (lower-side portion) of the second portion 420. As shown in FIG. 16, the step fixing portion 421 is fixed to the first fixation piece portion 117 of the step 110 while contacting the first fixation piece portion 117. That is, the step fixing portion 421 is fixed directly to the first fixation piece portion 117 without intervention of vibration insulating portions 30. The step fixing portion 421 includes a fixation hole 421a and a positioning hole 421b.

The fixation hole 421a shown in FIGS. 14 to 16 is used for fixation to the first fixation piece portion 117 of the step 110. The fixation hole 421a is opened to penetrate the step fixing portion 421 in the forward-backward direction (radial direction). As shown in FIG. 15B, the fixation hole 421a overlaps the fixation hole 117a of the first fixation piece portion 117 in a rear view. An appropriate fastener is inserted through the fixation hole 421a.

The positioning protrusion 117b of the step 110 (the first fixation piece portion 117) is inserted through the positioning hole 421b. The positioning hole 421b is opened to penetrate the step fixing portion 421 in the forward-backward direction (radial direction). The inner diameter of the positioning hole 421b is larger than the outer diameter of the head portion 117d of the positioning protrusion 117b.

As shown in FIG. 15, the positioning hole 421b is located on the laterally inner side relative to the fixation hole 421a. The inner diameter center of the positioning hole 421b is located below the inner diameter center of the fixation hole 421a. In addition, as shown in FIG. 15B, when the positioning protrusion 117b is inserted through the positioning hole 421b and the positioning hole 421b (the fender 400) is placed on the shaft portion 117c of the positioning protrusion 117b, the inner diameter centers of the fixation hole 421a and the fixation hole 117a of the step 110 (the first fixation piece portion 117) coincide with each other in a rear view.

In addition, as shown in FIG. 10, when the positioning hole 421b is placed on the shaft portion 117c of the positioning protrusion 117b, the inner diameter centers of the other fixation holes formed in the fender 400 and opened in the lateral direction (the first fixation hole 411, the second fixation holes 412, and the third fixation holes 413) and the fixation holes in the tractor body (the step 110, the seat base 120, and the ROPS 300) (the fixation hole 118a, the fixation holes 121d, the fixation hole 122d, the fixation hole 123g, and the fixation holes 312a) coincide with each other.

The reinforcing portion fixing portion 422 shown in FIG. 17 is a portion to which a second fixation piece portion 520 of the reinforcing portion 500, which will be described later, is fixed. The reinforcing portion fixing portion 422 defines a rear portion of the second portion 420. The reinforcing portion fixing portion 422 includes fixation holes 422a.

The fixation holes 422a are used for fixation to the second fixation piece portion 520 of the reinforcing portion 500, which will be described later. The fixation holes 422a are opened to penetrate the reinforcing portion fixing portion 422 in the vertical direction. A pair of fixation holes 422a are located at a distance in the lateral direction. Appropriate fasteners are inserted through the fixation holes 422a.

The reinforcing portion 500 shown in FIGS. 10 and 17 reinforces the fender 400. The reinforcing portion 500 reinforces the fender 400 by connecting the first portion 410 and the second portion 420 of the fender 400. The reinforcing portion 500 is provided on the inner surface of the fender 400 (the laterally outer surface of the first portion 410 and the lower surface of the second portion 420). The reinforcing portion 500 is provided at a rear portion of the fender 400. The reinforcing portion 500 includes a first fixation piece portion 510, a second fixation piece portion 520, and a connecting piece portion 530.

The first fixation piece portion 510 shown in FIG. 17 is fixed to the first portion 410 and the second fixation piece portion 312 of the ROPS 300. The first fixation piece portion 510 defines a lower-side portion of the reinforcing portion 500. The first fixation piece portion 510 preferably has a substantially plate shape whose thickness direction is in the lateral direction. The first fixation piece portion 510 preferably has a substantially rectangular shape that is longer in the vertical direction in a side view. The first fixation piece portion 510 is provided to contact the laterally outer surface of the first portion 410. The first fixation piece portion 510 includes fixation holes 511.

The fixation holes 511 are used for fixation to the first portion 410 and the second fixation piece portion 312. The fixation holes 511 are opened to penetrate the first fixation piece portion 510 in the lateral direction. A pair of fixation holes 511 are located at a distance in the vertical direction. The fixation holes 511 overlap the third fixation holes 413 and the fixation holes 312a of the second fixation piece portion 312 in a side view. The shaft portions 21 of fasteners 20 are inserted through the fixation holes 511.

The second fixation piece portion 520 is fixed to the reinforcing portion fixing portion 422 of the second portion 420. The second fixation piece portion 520 defines an upper-side portion of the reinforcing portion 500. The second fixation piece portion 520 preferably has a substantially plate shape whose thickness direction is in the vertical direction. The second fixation piece portion 520 preferably has a substantially rectangular shape that is longer in the lateral direction in a plan view. The second fixation piece portion 520 is provided to contact the lower surface of the reinforcing portion fixing portion 422 of the second portion 420. The second fixation piece portion 520 includes fixation holes 521.

The fixation holes 521 are used for fixation to the reinforcing portion fixing portion 422 of the second portion 420. The fixation holes 521 are opened to penetrate the second fixation piece portion 520 in the vertical direction. A pair of second fixation piece portions 520 are located at a distance in the lateral direction. The fixation holes 521 overlap the fixation holes 422a of the second portion 420 in a plan view. Appropriate fasteners are inserted through the fixation holes 521.

The connecting piece portion 530 connects the first fixation piece portion 510 and the second fixation piece portion 520. More specifically, the connecting piece portion 530 connects the upper end portion of the first fixation piece portion 510 and the laterally inner end portion of the second fixation piece portion 520.

The following will describe the manner of fixing the fender 400 and the reinforcing portion 500 to the tractor body (the step 110, the seat base 120, and the ROPS 300) with reference to FIGS. 10 to 13, 16 and 17.

As shown in FIGS. 13 and 16, appropriate fasteners are inserted through the first fixation hole 411, the second fixation holes 412, and the fixation hole 421a of the fender 400, the fixation hole 117a and the fixation hole 118a of the step 110, and the fixation holes 121d, the fixation hole 122d, and the fixation hole 123g of the seat base 120 to fasten the fender 400 to the step 110 and the seat base 120. The fender 400 is thus fixed to the step 110 and the seat base 120.

In addition, as shown in FIGS. 11, 13, and 17, the shaft portions 21 of fasteners 20 are inserted through the fixation holes 511 of the reinforcing portion 500 and the holes 31 of vibration insulating portions 30 attached to the third fixation holes 413 of the fender 400, and the shaft portions 21 are threadedly engaged with the fixation holes 312a of the ROPS 300. Note that, in the example shown in FIG. 11, appropriate cylindrical collars are interposed between the shaft portions 21 of the fasteners 20 and the holes 31 of the vibration insulating portions 30. The fender 400 and the reinforcing portion 500 are thus fixed to the ROPS 300.

The following will describe the operation of attaching the fender 400 and the reinforcing portion 500 with reference to FIGS. 14 to 17.

The fender 400 is attached to the step 110, the seat base 120, and the ROPS 300 fixed to the transmission case 4.

First, an operator moves the fender 400 forward relative to the step 110 (the first fixation piece portion 117) as shown in FIGS. 14 and 15A, and insert the positioning protrusion 117b of the first fixation piece portion 117 through the positioning hole 421b of the fender 400.

Next, with the positioning protrusion 117b being inserted through the positioning hole 421b, the operator moves the fender 400 downward and places the positioning hole 421b (the fender 400) on the shaft portion 117c of the positioning protrusion 117b (put the inner surface of the positioning hole 421b into contact with the upper surface of the shaft portion 117c) as shown in FIGS. 15B and 16. In this state, the inner diameter centers of the fixation hole 421a and the fixation hole 117a of the step 110 (the first fixation piece portion 117) coincide with each other. In addition, in this state, as shown in FIG. 10, the inner diameter centers of the fixation holes of the first portion 410 of the fender 400 (the first fixation hole 411, the second fixation holes 412, and the third fixation holes 413) and the corresponding fixation holes of the step 110 and the ROPS 300 (the fixation holes 118a, 121d, 122d, 123g, and 312a) coincide with each other. In addition, in this state, the movement of the fender 400 relative to the step 110 in the radial direction of the positioning protrusion 117b is restricted.

In this manner, the fender 400 can be easily positioned with respect to the step 110 and the seat base 120 while the positioning protrusion 117b is inserted through the positioning hole 421b and the fender 400 is placed on the step 110. This eliminates the need for an operation of positioning the fender 400 while supporting the load of the fender 400 by an operator's hand, and can improve the workability of attaching the fender 400.

Next, the operator fixes the fender 400 to the tractor body except for the ROPS 300 (the step 110 and the seat base 120) by using appropriate fasteners. More specifically, the operator inserts appropriate fasteners through the fixation holes formed in the fender 400 (the first fixation hole 411, the second fixation holes 412, and the fixation hole 421a) and the fixation holes formed in the step 110 and the seat base 120 (the fixation hole 117a, the fixation hole 118a, the fixation holes 121d, the fixation hole 122d, and the fixation hole 123g) and fastening the fender 400 to the step 110 and the seat base 120 to fix the fender 400 to the above-mentioned tractor body.

At this time, the operator may first insert the fasteners through the respective fixation holes and then temporarily fasten the fastener (fastens them so as not to be completely fixed) to temporarily fix the fender 400 to the step 110 and the seat base 120. In this state, the movement of the fender 400 in the forward-backward direction is restricted by the fasteners inserted through the fixation holes formed in the first portion 410 of the fender 400 (the first fixation hole 411 and the second fixation holes 412) and the fixation holes formed in the step 110 and the seat base 120 (the fixation holes 118a, 121d, 122d, and 123g). This enables more effective positioning. Next, the operator finally fastens (completely fastens) the above-mentioned fasteners. The fender 400 is thus completely fixed to the step 110 and the seat base 120.

Next, the operator fixes the first portion 410 of the fender 400 and the reinforcing portion 500 to the ROPS 300 by using fasteners 20. More specifically, as shown in FIGS. 11 and 17, the operator attaches vibration insulating portions 30 to the third fixation holes 413 of the fender 400 (the first portion 410) and inserts fasteners 20 through the fixation holes 312a of the ROPS 300 (the second fixation piece portion 312), the third fixation holes 413 of the fender 400 (the holes 31 of the vibration insulating portions 30), and the fixation holes 511 of the reinforcing portion 500 (the first fixation piece portion 510) and fixes the ROPS 300, the fender 400, and the reinforcing portion 500 by joint fastening. The ROPS 300, the fender 400, and the reinforcing portion 500 are thus fixed together.

Next, the operator fixes the second portion 420 of the fender 400 and the reinforcing portion 500 by using appropriate fasteners. More specifically, as shown in FIG. 17, the operator inserts appropriate fasteners through the fixation holes 422a of the reinforcing portion fixing portion 422 of the fender 400 (the second portion 420) and the fixation holes 521 of the reinforcing portion 500 (the second fixation piece portion 520) and fastens the second portion 420 of the fender 400 and the reinforcing portion 500 to fix the fender 400 and the reinforcing portion 500. The fender 400 and the reinforcing portion 500 are attached to the tractor body in the above-described manner.

In the tractor 1 as described above, vibration insulating portions 30 are interposed between the steps 110 and the seat base 120. More specifically, as shown in FIGS. 8 and 9, vibration insulating portions 30 are attached to the fixation holes 123d in the lower fixing portions 123c of the seat base 120 (the front wall portion 123) (the insertion portions 32 of the vibration insulating portions 30 are inserted through the fixation holes 123d). In addition, fasteners 20 are inserted through the fixation holes 123d (the holes 31 of the vibration insulating portions 30) and the fourth fixation holes 116 of the steps 110 (the main bodies 111) to fix the steps 110 and the seat base 120. By performing the fixation in this manner, the vibration insulating portions 30 (the second increased diameter portions 34) can be interposed between the steps 110 and the seat base 120. Thus, the transmission of vibration from the fenders 400 to the steps 110 via the seat base 120 is reduced or prevented.

In addition, in the tractor 1, as shown in FIGS. 4 and 5, vibration insulating portions 30 are also interposed between the step supporting portion 101 (the first step supporting portion 102, the second step supporting portions 103, and the third step supporting portions 104) and the steps 110 in generally the same way as the above-described manner.

Thus, vibration transmitted from the transmission case 4 to the steps 110 is reduced or prevented.

In addition, in the tractor 1, as shown in FIGS. 6 and 7, vibration insulating portions 30 are also interposed between the seat base supporting portion 105 (the first seat base supporting portion 106 and the second seat base supporting portions 107) and the seat base 120 in generally the same way as the above-described manner. Thus, vibration transmitted from the transmission case 4 to the seat base 120 and the fenders 400 is reduced or prevented. Thus, vibration transmitted from the seat base 120 and the fenders 400 to the steps 110 is reduced or prevented.

In addition, in the tractor 1 as described above, vibration insulating portions 30 are interposed between the ROPS 300 and the fenders 400 and between the fenders 400 and the reinforcing portion 500. More specifically, as shown in FIGS. 11 and 17, vibration insulating portions 30 are attached to the third fixation holes 413 formed in the fender 400. In addition, fasteners 20 are inserted through the third fixation holes 413 (the holes 31 of the vibration insulating portions 30), the fixation holes 312a of the ROPS 300, and the fixation holes 511 of the reinforcing portion 500 to fix the ROPS 300, the fender 400, and the reinforcing portion 500.

By performing the fixation in this manner, the vibration insulating portions 30 (the second increased diameter portions 34) can be interposed between the ROPS 300 and the fender 400, and the vibration insulating portions 30 (the first increased diameter portions 33) can be interposed between the fender 400 and the reinforcing portion 500. Thus, vibration transmitted from the ROPS 300 to the fender 400 and vibration transmitted from the ROPS 300 to the reinforcing portion 500 is reduced or prevented, and vibration transmitted from the fender 400 to the step 110 is reduced or prevented.

As described above, the tractor 1 (work vehicle) according to the present preferred embodiment includes the fender 400 covering the rear wheel 7; and the fixing portion (step 110) to which the fender 400 is fixed, and one of the fender 400 or the fixing portion (step 110) includes the positioning protrusion 117b protruding in a predetermined direction, and the other of the fender 400 and the fixing portion (step 110) includes the positioning hole 421b that can position the fender 400 with respect to the fixing portion (step 110) by receiving the positioning protrusion 117b inserted through it.

In this configuration, the workability of attaching the fender 400 can be improved. That is, by inserting the positioning protrusion 117b through the positioning hole 421b, the fender 400 can be easily positioned with respect to the fixing portion (step 110). Thus, the workability of attaching the fender 400 can be improved.

In addition, the positioning protrusion 117b includes the shaft portion 117c protruding from one of the fender 400 or the fixing portion (step 110) in the predetermined direction; and the head portion 117d provided at the tip portion of the shaft portion 117c in the protruding direction for suppressing coming off of the positioning hole 421b from the positioning protrusion 117b.

In this configuration, the workability of attaching the fender 400 can be better improved. That is, since the head portion 117d is provided, coming off of the fender 400 from the fixing portion (step 110) is reduced or prevented, and the workability of attaching the fender 400 can be better improved.

In addition, the head portion 117d preferably has a shape having a larger diameter than the shaft portion 117c.

In this configuration, the workability of attaching the fender 400 can be better improved. That is, since the head portion 117d preferably has a shape having a larger diameter than the shaft portion 117c, coming off of the fender 400 from the fixing portion (step 110) is reduced or prevented even when the fender 400 before fixation is displaced in any direction along the radial direction of the head portion 117d, and the workability of attaching the fender 400 can be better improved.

In addition, the fender 400 and the fixing portion (step 110) include the fixation holes 117a and 421a used to fix the fender 400 and the fixing portion (step 110) to each other, and the inner diameter centers of the fixation hole 421a of the fender 400 and the fixation hole (the fixation hole 117a) of the fixing portion (step 110) coincide with each other when one of the positioning protrusion 117b or the positioning hole 421b provided to the fender 400 is placed on the other of the positioning protrusion 117b or the positioning hole 421b provided to the fixing portion (step 110).

In this configuration, the workability of attaching the fender 400 can be better improved. That is, since the inner diameter centers of the fixation holes 117a and 421a of the fender 400 and the fixing portion (step 110) coincide with each other when the fender 400 is placed on the fixing portion (step 110) via the positioning protrusion 117b and the positioning hole 421b, fixation via a fastener 20 such as a bolt can be performed in this state.

In addition, the fender 400 and the fixing portion (step 110) include the fixation holes (fixation holes 117a, 118a, 121d, 122d, 123g, 312a, and 421a, the first fixation hole 411, the second fixation holes 412, the third fixation holes 413) used to fix the fender 400 and the fixing portion (step 110) to each other, and the fixation holes include orthogonal holes having an opening direction orthogonal to the opening direction of the positioning hole 421b (the fixation holes 118a, 121d, 122d, 123g, and 312a, the first fixation hole 411, the second fixation holes 412, the third fixation holes 413).

In this configuration, the workability of attaching the fender 400 can be better improved. That is, when the positioning protrusion 117b is inserted through the positioning hole 421b, the movement of the fender 400 relative to the fixing portion (step 110) in the radial direction of the positioning protrusion 117b is restricted, but the movement in the axial direction (inserting direction) of the positioning protrusion 117b is allowed. Here, by inserting fasteners through the orthogonal holes having an opening direction orthogonal to that of the positioning hole 421b and temporarily fastening the fasteners, the movement of the fender 400 is restricted in the axial direction as well as in the radial direction, and more effective positioning is enabled.

In addition, the fixing portion is the step 110 provided to the driver's seat, and the positioning protrusion 117b is provided to the step 110.

In this configuration, the workability of attaching the fender 400 can be better improved. That is, since the positioning protrusion 117b is provided to a member having a relatively high stiffness, the fender 400 can be stably supported via the positioning protrusion 117b.

In addition, the tractor 1 (work vehicle) according to the present preferred embodiment includes the fender 400 covering the rear wheel 7; the seat base 120 to which the fender 400 is fixed and on which the seat 130 is installed; the step 110 that is disposed above or below the seat base 120 and to which the seat base 120 is fixed; and the first vibration insulating portion (vibration insulating portion 30) having a vibration insulating property and interposed between the step 110 and the seat base 120.

In this configuration, the transmission of vibration from the fender 400 to the step 110 is reduced or prevented. That is, since the first vibration insulating portion (vibration insulating portion 30) is interposed between the step 110 and the seat base 120, the transmission of vibration from the fender 400 to the step 110 via the seat base 120 is reduced or prevented.

In addition, the tractor 1 (work vehicle) includes the ROPS 300 that is disposed beside the fender 400 and to which the fender 400 is fixed; and the second vibration insulating portion (vibration insulating portion 30) having a vibration insulating property and interposed between the ROPS 300 and the fender 400.

In this configuration, vibration transmitted from the fender 400 to the step 110 is more effectively reduced or prevented. That is, since the second vibration insulating portion (vibration insulating portion 30) is interposed between the ROPS 300 and the fender 400, vibration in the array direction of the ROPS 300 and the fender 400 (the lateral direction) transmitted from the ROPS 300 to the fender 400 is reduced or prevented. Thus, vibration transmitted from the fender 400 to the step 110 is reduced or prevented.

In addition, the fender 400 includes the fixation hole (third fixation hole 413) that is opened in a direction in which the fender 400 and the ROPS 300 are arrayed (lateral direction) and through which a fastener 20 used for fixation to the ROPS 300 is inserted, and the second vibration insulating portion (vibration insulating portion 30) has the hole 31 through which the fastener 20 is inserted and is inserted through the fixation hole (third fixation hole 413).

In this configuration, vibration transmitted from the fender 400 to the step 110 is more effectively reduced or prevented. That is, since the second vibration insulating portion (vibration insulating portion 30) is inserted through the fixation hole (third fixation hole 413) and the fastener 20 used to fix the fender 400 and the ROPS 300 to each other is inserted through the second vibration insulating portion (vibration insulating portion 30), vibration in the vertical direction and the forward-backward direction transmitted from the ROPS 300 to the fender 400 is reduced or prevented. Thus, vibration transmitted from the fender 400 to the step 110 is reduced or prevented.

In addition, the tractor 1 (work vehicle) includes the reinforcing portion 500 that reinforces the fender 400; and the third vibration insulating portion (vibration insulating portion 30) having a vibration insulating property and interposed between the reinforcing portion and the ROPS.

In this configuration, vibration transmitted from the fender 400 to the step 110 is more effectively reduced or prevented. That is, by enhancing the stiffness of the fender 400 by the reinforcing portion 500, vibration of the fender 400 is reduced or prevented. In addition, since the third vibration insulating portion (vibration insulating portion 30) is interposed between the reinforcing portion 500 and the ROPS 300, vibration transmitted from the ROPS 300 to the reinforcing portion 500 is reduced or prevented. Thus, vibration transmitted from the fender 400 to the step 110 is reduced or prevented.

In addition, the third vibration insulating portion (vibration insulating portion 30) is used in common with the second vibration insulating portion (vibration insulating portion 30).

In this configuration, using the third vibration insulating portion (vibration insulating portion 30) in common with the second vibration insulating portion (vibration insulating portion 30) prevents an increase in the number of members.

In addition, the fender 400 includes the first portion 410 fixed to the ROPS 300; and the second portion 420 covering a radially outer portion of the rear wheel 7, and the reinforcing portion 500 connects the first portion 410 and the second portion 420.

In this configuration, vibration transmitted from the fender 400 to the step 110 is more effectively reduced or prevented. That is, since the first portion 410 and the second portion 420 of the fender is connected by the reinforcing portion 500, the stiffness of the fender 400 can be effectively enhanced. Thus, vibration of the fender 400 is reduced or prevented, and vibration transmitted from the fender 400 to the step 110 is reduced or prevented.

In addition, the fender 400 includes the fixing portion (first fixation piece portion 117) fixed to the step 110 while contacting the step 110.

In this configuration, the transmission of vibration from the fender 400 to the step 110 is reduced or prevented while securely fixing the fender 400 to the step 110. That is, the fender 400 can be securely fixed to the step 110 at the fixing portion (first fixation piece portion 117), and at the other portion, the fixation to the step 110 is made by interposing the first vibration insulating portion (vibration insulating portion 30) and thus the vibration is reduced or prevented.

In addition, the tractor 1 (work vehicle) includes the mission case (transmission case 4) containing the power transmission mechanism; the first supporting portion (step supporting portion 101) that is provided to the mission case (transmission case 4) and supports the step 110 from below and to which the step 110 is fixed; and the fourth vibration insulating portion (vibration insulating portion 30) having a vibration insulating property and interposed between the first supporting portion (step supporting portion 101) and the step 110.

In this configuration, vibration of the step 110 is more effectively reduced or prevented.

That is, since the fourth vibration insulating portion (vibration insulating portion 30) is interposed between the first supporting portion (step supporting portion 101) provided to the mission case (transmission case 4) and the step 110, vibration transmitted from the mission case (transmission case 4) to the step 110 is reduced or prevented.

In addition, the tractor 1 (work vehicle) includes the mission case (transmission case 4) containing the power transmission mechanism; the second supporting portion (seat base supporting portion 105) that is provided to the mission case (transmission case 4) and supports the seat base 120 from below and to which the seat base 120 is fixed; and the fifth vibration insulating portion (vibration insulating portion 30) having a vibration insulating property and interposed between the second supporting portion (seat base supporting portion 105) and the seat base 120.

In this configuration, vibration of the step 110 is more effectively reduced or prevented. That is, since the fifth vibration insulating portion (vibration insulating portion 30)

is interposed between the second supporting portion (seat base supporting portion 105) provided to the mission case (transmission case 4) and the seat base 120, vibration transmitted from the mission case (seat base supporting portion 105) to the seat base 120 and the fender 400 is reduced or prevented. Thus, vibration transmitted from the seat base 120 and the fenders 400 to the steps 110 is reduced or prevented.

Note that the tractor 1 according to the present preferred embodiment is an example of a work vehicle.

In addition, the transmission case 4 according to the present preferred embodiment is an example of a mission case.

In addition, the vibration insulating portions 30 according to the present preferred embodiment are examples of the first vibration insulating portion, the second vibration insulating portion, the third vibration insulating portion, the fourth vibration insulating portion, and the fifth vibration insulating portion.

In addition, the step supporting portion 101 according to the present preferred embodiment is an example of the first supporting portion.

In addition, the seat base supporting portion 105 according to the present preferred embodiment is an example of the second supporting portion.

In addition, the step 110 according to the present preferred embodiment is an example of the fixing portion.

In addition, the first fixation piece portion 117 according to the present preferred embodiment is an example of the fixing portion.

Although various preferred embodiments of the present disclosure have been described above, the present disclosure is not limited to the above-described configuration, and various changes are possible within the scope of the present invention as recited in the claims.

For example, although the present preferred embodiment shows a configuration in which the positioning protrusion 117b is provided to the step 110, there is no limitation thereto. For example, the positioning protrusion 117b may be provided to any member on the tractor body side such as the seat base 120 or the ROPS 300.

In addition, although the present preferred embodiment shows a configuration in which the positioning hole 421b is provided to the fender 400 and the positioning protrusion 117b is provided to the step 110, there is no limitation thereto. For example, a configuration in which the positioning protrusion 117b is provided to the fender 400 and the positioning hole 421b is provided to the step 110 may be used.

In addition, the portions at which the fender 400 is fixed to the tractor body (the step 110, the seat base 120, and the ROPS 300) are not limited to the above-mentioned ones, and any fixing portions may be used.

In addition, although the present preferred embodiment shows an example where the fasteners 20 include bolts, there is no limitation thereto. Various fasteners capable of fixing a plurality of members such as rivets may be used as the fasteners 20.

In addition, although the present preferred embodiment shows an example where the vibration insulating portions 30 are formed of a material having flexibility, there is no limitation thereto. Various materials and structures having a vibration insulating property may be used for the vibration insulating portions 30.

In addition, although the present preferred embodiment shows a configuration in which the fender 400 is fixed to the first fixation piece portion 117 while contacting the first fixation piece portion 117 of the step 110, there is no limitation thereto. For example, a vibration insulating portion 30 may be interposed between the first fixation piece portion 117 and the fender 400.

In addition, the present preferred embodiment shows a configuration in which a plurality of vibration insulating portions 30 are interposed between the step supporting portion 101 (the first step supporting portion 102, the second step supporting portions 103, and the third step supporting portions 104) and the steps 110, there is no limitation thereto. For example, some or all of the plurality of vibration insulating portions 30 may not be provided.

In addition, the present preferred embodiment shows a configuration in which a plurality of vibration insulating portions 30 are interposed between the seat base supporting portion 105 (the first seat base supporting portion 106 and the second seat base supporting portions 107) and the seat base 120, there is no limitation thereto. For example, some or all of the plurality of vibration insulating portions 30 may not be provided.

In addition, although the present preferred embodiment shows a configuration in which the vibration insulating portions interposed between the ROPS 300 and the fender 400 and the vibration insulating portions 30 interposed between the reinforcing portion 500 and the ROPS 300 are used in common, there is no limitation thereto. For example, the vibration insulating portions 30 interposed between the ROPS 300 and the fender 400 and the vibration insulating portion 30 interposed between the reinforcing portion 500 and the ROPS 300 may be individually provided.

In addition, although the present preferred embodiment shows a configuration in which the reinforcing portion 500 is provided to the fender 400, there is no limitation thereto. For example, the reinforcing portion 500 may not be provided.

In addition, although the tractor 1 is illustrated as an example of the work vehicle in the above-described preferred embodiment, there is no limitation thereto. For example, the work vehicle may be another agricultural vehicle, construction vehicle, industrial vehicle, or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
    a fender covering a rear wheel;
    a seat base to which the fender is fixed and on which a seat is installed;
    a step above or below the seat base and to which the seat base is fixed;
    a first vibration insulating portion having a vibration insulating property and interposed between the step and the seat base;
    a Rollover Protection Structure (ROPS) beside the fender and to which the fender is fixed;
    a second vibration insulating portion having a vibration insulating property and interposed between the ROPS and the fender;
    a reinforcing portion that reinforces the fender; and
    a third vibration insulating portion having a vibration insulating property and interposed between the reinforcing portion and the ROPS; wherein
    the fender includes:
        a first portion fixed to the ROPS; and a second portion covering a radially outer portion of the rear wheel; and the reinforcing portion connects the first portion and the second portion.

2. The work vehicle according to claim 1, wherein the fender includes a fixing portion fixed to the step while contacting the step.

3. The work vehicle according to claim 1, further comprising:
a mission case containing a power transmission mechanism;
a first supporting portion that is provided to the mission case and supports the step from below and to which the step is fixed; and
a fourth vibration insulating portion having a vibration insulating property and interposed between the first supporting portion and the step.

4. The work vehicle according to claim 1, further comprising:
a mission case containing a power transmission mechanism;
a second supporting portion that is provided to the mission case and supports the seat base from below and to which the seat base is fixed; and
a fifth vibration insulating portion having a vibration insulating property and interposed between the second supporting portion and the seat base.

5. A work vehicle comprising:
a fender covering a rear wheel;
a seat base to which the fender is fixed and on which a seat is installed;
a step above or below the seat base and to which the seat base is fixed;
a first vibration insulating portion having a vibration insulating property interposed between the step and the seat base;
a Rollover Protection Structure (ROPS) beside the fender and to which the fender is fixed;
a second vibration insulating portion having a vibration insulating property and interposed between the ROPS and the fender;
a reinforcing portion that reinforces the fender; and
a third vibration insulating portion having a vibration insulating property and interposed between the reinforcing portion and the ROPS; wherein
the fender includes a fixation hole that is opened in a direction in which the fender and the ROPS are arrayed and through which a fastener used for fixation to the ROPS is insertable;
the second vibration insulating portion has a hole through which the fastener is insertable and is insertable through the fixation hole; and
the fender includes:
a first portion fixed to the ROPS; and
a second portion covering a radially outer portion of the rear wheel; and
the reinforcing portion connects the first portion and the second portion.

6. The work vehicle according to claim 5, wherein the fender includes a fixing portion fixed to the step while contacting the step.

7. The work vehicle according to claim 5, further comprising:
a mission case containing a power transmission mechanism;
a first supporting portion that is provided to the mission case and supports the step from below and to which the step is fixed; and
a fourth vibration insulating portion having a vibration insulating property and interposed between the first supporting portion and the step.

8. The work vehicle according to claim 5, further comprising:
a mission case containing a power transmission mechanism;
a second supporting portion that is provided to the mission case and supports the seat base from below and to which the seat base is fixed; and
a fifth vibration insulating portion having a vibration insulating property and interposed between the second supporting portion and the seat base.

9. A work vehicle comprising:
a fender covering a rear wheel;
a seat base to which the fender is fixed and on which a seat is installed;
a step above or below the seat base and to which the seat base is fixed;
a first vibration insulating portion having a vibration insulating property interposed between the step and the seat base;
a Rollover Protection Structure (ROPS) beside the fender and to which the fender is fixed;
a second vibration insulating portion having a vibration insulating property and interposed between the ROPS and the fender;
a reinforcing portion that reinforces the fender; and
a third vibration insulating portion having a vibration insulating property and interposed between the reinforcing portion and the ROPS; wherein
the third vibration insulating portion is used in common with the second vibration insulating portion; and
the fender includes:
a first portion fixed to the ROPS; and
a second portion covering a radially outer portion of the rear wheel; and
the reinforcing portion connects the first portion and the second portion.

10. The work vehicle according to claim 9, wherein the fender includes a fixing portion fixed to the step while contacting the step.

11. The work vehicle according to claim 9, further comprising:
a mission case containing a power transmission mechanism;
a first supporting portion that is provided to the mission case and supports the step from below and to which the step is fixed; and
a fourth vibration insulating portion having a vibration insulating property and interposed between the first supporting portion and the step.

12. The work vehicle according to claim 9, further comprising:
a mission case containing a power transmission mechanism;
a second supporting portion that is provided to the mission case and supports the seat base from below and to which the seat base is fixed; and
a fifth vibration insulating portion having a vibration insulating property and interposed between the second supporting portion and the seat base.

13. A work vehicle comprising:
a fender covering a rear wheel;

a seat base to which the fender is fixed and on which a seat is installed;

a step above or below the seat base and to which the seat base is fixed;

a first vibration insulating portion having a vibration insulating property interposed between the step and the seat base;

a Rollover Protection Structure (ROPS) beside the fender and to which the fender is fixed;

a second vibration insulating portion having a vibration insulating property and interposed between the ROPS and the fender;

a reinforcing portion that reinforces the fender; and a third vibration insulating portion having a vibration insulating property and interposed between the reinforcing portion and the ROPS; wherein the fender includes a fixation hole that is opened in a direction in which the fender and the ROPS are arrayed and through which a fastener used for fixation to the ROPS is insertable;

the second vibration insulating portion has a hole through which the fastener is insertable and is insertable through the fixation hole;

the third vibration insulating portion is used in common with the second vibration insulating portion; and the fender includes:

a first portion fixed to the ROPS; and a second portion covering a radially outer portion of the rear wheel; and the reinforcing portion connects the first portion and the second portion.

14. The work vehicle according to claim 13, wherein the fender includes a fixing portion fixed to the step while contacting the step.

15. The work vehicle according to claim 13, further comprising:

a mission case containing a power transmission mechanism;

a first supporting portion that is provided to the mission case and supports the step from below and to which the step is fixed; and a fourth vibration insulating portion having a vibration insulating property and interposed between the first supporting portion and the step.

16. The work vehicle according to claim 13, further comprising:

a mission case containing a power transmission mechanism;

a second supporting portion that is provided to the mission case and supports the seat base from below and to which the seat base is fixed; and a fifth vibration insulating portion having a vibration insulating property and interposed between the second supporting portion and the seat base.

* * * * *